US011567812B2

(12) United States Patent
Kulkarni et al.

(10) Patent No.: US 11,567,812 B2
(45) Date of Patent: Jan. 31, 2023

(54) UTILIZING A NATURAL LANGUAGE MODEL TO DETERMINE A PREDICTED ACTIVITY EVENT BASED ON A SERIES OF SEQUENTIAL TOKENS

(71) Applicant: Dropbox, Inc., San Francisco, CA (US)

(72) Inventors: Ranjitha Gurunath Kulkarni, Sunnyvale, CA (US); Xingyu Xiang, San Francisco, CA (US); Jongmin Baek, Foster City, CA (US); Ermo Wei, San Bruno, CA (US)

(73) Assignee: Dropbox, Inc., San Francisco, CA (US)

( * ) Notice: Subject to any disclaimer, the term of this patent is extended or adjusted under 35 U.S.C. 154(b) by 190 days.

(21) Appl. No.: 17/065,266

(22) Filed: Oct. 7, 2020

(65) Prior Publication Data
US 2022/0107852 A1    Apr. 7, 2022

(51) Int. Cl.
*G06F 9/54* (2006.01)
*G06F 40/284* (2020.01)
*G06N 3/08* (2006.01)
*G06N 5/02* (2006.01)

(52) U.S. Cl.
CPC ............ *G06F 9/542* (2013.01); *G06F 40/284* (2020.01); *G06N 3/08* (2013.01); *G06N 5/02* (2013.01)

(58) Field of Classification Search
None
See application file for complete search history.

(56) References Cited

U.S. PATENT DOCUMENTS

| 8,489,599 | B2 | 7/2013 | Bellotti |
| 9,535,897 | B2 * | 1/2017 | Anderson ............. G06F 16/951 |
| 10,062,039 | B1 | 8/2018 | Lockett |
| 10,496,924 | B1 | 12/2019 | Highnam et al. |

(Continued)

FOREIGN PATENT DOCUMENTS

CN        111460100 A        7/2020

OTHER PUBLICATIONS

Devlin J., et al., "Bert: Pre-training of deep bidirectional transformers for language-understanding," May 24, 2019, 16 pages.

(Continued)

*Primary Examiner* — Syed A Roni
(74) *Attorney, Agent, or Firm* — Keller Preece PLLC

(57) ABSTRACT

The present disclosure relates to systems, methods, and non-transitory computer-readable media that can leverage a natural language model to determine a most probable candidate sequence of tokens and thereby generate a predicted user activity. In particular, the disclosed systems can tokenize activity event vectors to generate a series of sequential tokens that correspond to recent user activity of one or more user accounts. In addition, the disclosed systems can, for each candidate (e.g., hypothetical) user activity, augment the series of sequential tokens to include a corresponding token. Based on respective probability scores for each of the augmented series of sequential tokens, the disclosed systems can identify as the predicted user activity, a candidate user activity corresponding to one of the augmented series of sequential tokens associated with a highest probability score. Based on the predicted user activity, the disclosed systems can surface one or more suggestions to a client device.

20 Claims, 10 Drawing Sheets

(56) References Cited

U.S. PATENT DOCUMENTS

| | | | |
|---|---|---|---|
| 10,614,113 | B2 | 4/2020 | Peled et al. |
| 10,769,381 | B2 | 9/2020 | Tacchi et al. |
| 10,803,380 | B2 | 10/2020 | Dai et al. |
| 2004/0154000 | A1 | 8/2004 | Kasravi et al. |
| 2007/0299713 | A1 | 12/2007 | Macbeth et al. |
| 2012/0041955 | A1 | 2/2012 | Regev et al. |
| 2019/0163671 | A1* | 5/2019 | Vengerov .......... G06Q 30/0255 |
| 2020/0311543 | A1 | 10/2020 | Jamali et al. |
| 2020/0320388 | A1 | 10/2020 | Lyske et al. |

OTHER PUBLICATIONS

Jurafsky D., et al., "N-gram Language Models," Oct. 2, 2019, 28 pages.
Mikolov T., "Distributed representations of words and phrases and their compositionality," 2013, 9 pages.
Pennington J., et al., "Glove: Global vectors for word representation," 2014, 12 pages.
Zhao L., "Event Prediction in the Big Data Era: A Systematic Survey," Aug. 4, 2020, 40 pages.
BTH, "Email Classification with Machine Learning and Word Embeddings for Improved Customer Support," 2017, 65 pages.

* cited by examiner

UTILIZING A NATURAL LANGUAGE MODEL TO DETERMINE A PREDICTED ACTIVITY EVENT BASED ON A SERIES OF SEQUENTIAL TOKENS

BACKGROUND

Recent years have seen significant improvements in computer systems that implement content suggestion models or recommendation systems. With these advancements, computer systems can predict content for which a user may have interest. To illustrate, conventional systems have applied recommendation models in a variety of different applications to recommend content, such as video and music playlists, product promotions, social media connections, etc. While conventional recommendation systems have worked with some applications, as described above, conventional recommendation systems often cannot be applied successfully to a content management system (e.g., a cloud-storage and/or cloud-work-space system). Indeed, a number of problems exist when conventional recommendation systems that lead to decreased accuracy of predictions and an inflexible model that is not equipped for more complex systems (e.g., such as a content management system).

For example, conventional recommendation systems suffer from decreased accuracy of predictions because conventional recommendation systems often are limited to considering a limited subset of user activity as input. Indeed, many conventional recommendation systems are trained based on a limited set of user actions and a limited set of potential recommendations. With a video service application, for instance, conventional recommendation systems may determine whether or not a user viewed a first video. The conventional recommendation system may then recommend that the user view a second video based on whether the user viewed the first video. In other words, conventional recommendation systems simply determine a single user action that corresponds with a single recommendation type.

Content management systems, however, include a vast number of potential user actions and a vast number of potential recommendations. For example, with respect to a digital file stored on the content management system alone, a single user can create a file, view a file, share a file, edit a file, move the storage location of the file, not view the file, comment on the file, tag the file, delete the file, sync the file with a specific client device, as well as other user actions. Similarly, there are a vast number of potential recommendations to make with respect to a digital file and a particular user. Moreover, a single file may be shared with a team of users all capable of performing the large number of user actions and executing the large number of recommendations. Furthermore, the above example only relates to a single digital file. Modern content management systems provide cloud-based smart work spaces that manage not only digital content, but manage all types of services including calendar items, task lists, project spaces, different types of digital communication (e.g., IM or Video Conference), as well as other services. These services incorporate additional user actions and additional potential recommendations.

As discussed above, conventional recommendation systems are not equipped to consider and analyze the vast number of user actions, nor are conventional recommendation systems equipped to accurately choose from a vast number of potential recommendations. Indeed, most conventional recommendation systems are unable to accurately account for the large number of potential user actions and recommendations, and accordingly, conventional recommendation systems are left without sufficient context to make an accurate prediction about a next user action. In turn, without sufficient context, the conventional systems often provide inapplicable suggested content or recommendations based on an inaccurately predicted next user action. With the suggested content or recommendation being inapplicable, conventional recommendation systems often waste computer resources and provide a frustrating user experience.

In addition to decreased accuracy of system recommendations, conventional recommendation systems also suffer from model inflexibility. As an example, a single user action to edit a first filename to a second filename may be represented by various complex data representations within a content management system. Conventional recommendation systems are often are designed to work with a specific and inflexible fixed data structure. Due to the need to have a fixed data structure of user activity, conventional recommendation systems are ill-equipped to handle large numbers and different potential data representations that are created from the large number of user actions that exist within modern content management systems. Accordingly, because conventional systems are inflexible in being able to handle different data representations of a user action, conventional systems cannot properly intake and analyze all of the potential user actions that exist within a modern content management system. Therefore, conventional recommendation systems are often unable to incorporate and analyze all relevant data in determining a recommendation.

The subject matter claimed herein is not limited to embodiments that solve any disadvantages or that operate only in environments such as those described above. Rather, this background is only provided to illustrate example technology areas where some embodiments described herein may be practiced.

BRIEF SUMMARY

Embodiments of the present disclosure provide benefits and/or solve one or more of the foregoing or other problems in the art with systems, non-transitory computer-readable media, and methods that utilize a natural language model to predict a next user activity event based on an ordered series of preceding user activity events. For example, the disclosed systems can analyze raw event data for historical user activity to create event tokens based on identified features from the raw event data. Each event token represents an activity event feature vector corresponding to an activity event associated with a set of features in the raw event data. Provided an ordered series of event tokens representing a sequence of user activity events, the system uses a trained natural language model to generate candidate sequences of activity events. Each candidate sequence of activity events includes an activity event representing a respective hypothetical (or next) user activity event within the sequence of activity events. In turn, the disclosed systems can select, as the predicted next user activity event, the most probable next user activity event represented in a candidate sequence of activity events. In accordance with the selected next user activity event, the disclosed systems can provide one or more suggestions for display within a graphical user interface of a client device or perform one or more recommended actions.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
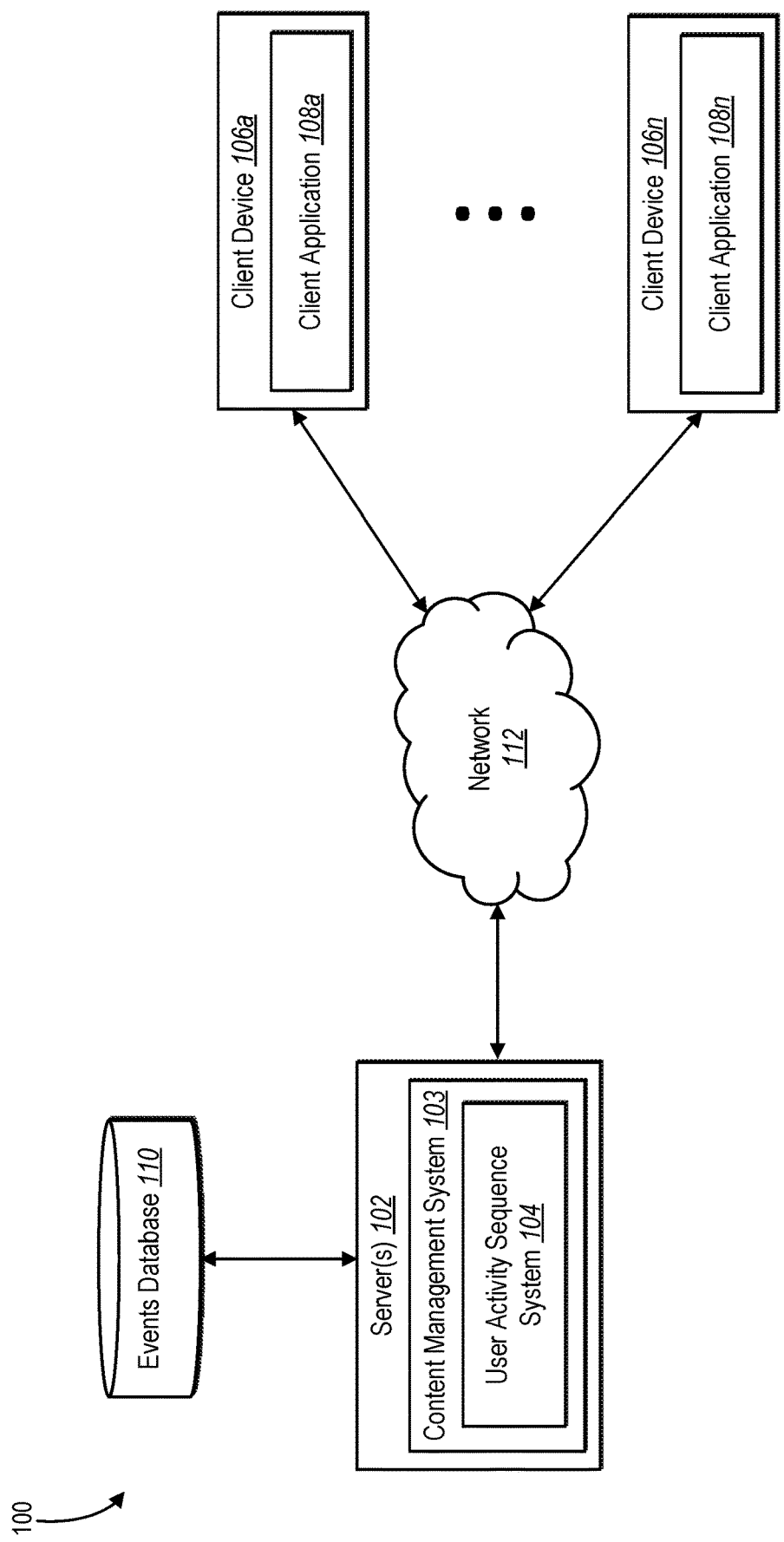
FIG. 1 illustrates a diagram of a computing system environment including a user activity sequence system in accordance with one or more embodiments.

One or more embodiments described herein include a user activity sequence system that utilized a natural language model to intelligently predict and provide user activity recommendations based on generalized representations of user activity sequences. Specifically, the user activity sequence system can create an activity event vector (e.g., a feature vector) for each user activity event that includes various attributes of a given activity event, for example, a timestamp, action type, device type, filename, and other file metadata. The user activity sequence system can hash the activity event vector to create an event token representing the user activity event. Accordingly, based on a vocabulary of learned event tokens and learned sequences of event tokens, the user activity sequence system can utilize a natural language model (NLM) to determine a predicted activity event. To do so, the user activity sequence system can represent each user activity event as an event token and leverage the NLM to determine a predicted event token (e.g., a next user activity event) in a sequence of event tokens. In other words, the user activity sequence system provides as input event tokens and sequences of event tokens to a trained NLM, where the NLM processes individual event tokens as "words" and sequences of event tokens as "sentences" to accurately predict a next user activity event (e.g., the next word in a sentence). Based on the predicted user activity event, the user activity sequence system can provide recommendations and suggestions, perform actions (e.g., sync a file with a particular device), and/or perform other digital actions.

As just mentioned, the user activity sequence system can generate activity event vectors based on feature information corresponding to previous activity events. In some embodiments, the previous activity events are limited to a particular duration and/or quantity (e.g., up to one hundred activity events within the past week). However, the previous activity events can broadly include activity events associated with any number of files, types of files, task lists, calendar items, user accounts and/or groups of user accounts of a content management system. To illustrate, the user activity sequence system can identify feature attributes (e.g., a subset of relevant features) of an activity event included within raw event data within a database. For example, and as will be discussed below in more detail, these features may include activity event data, such as a byte size, an action type, a filename, a file extension, a timestamp differential, whether an action was taken on a file or on a directory of files/folders, etc. The user activity sequence system can then convert (e.g., transform) these or other features for a given user activity event to vector embeddings. Accordingly, the user activity sequence system combines the vector embeddings into a string (e.g., an n-dimensional float vector) to generate an activity event vector corresponding to a particular user activity event.

Subsequently, the user activity sequence system can utilize a hashing function (e.g., a Secure Hash Algorithm 2, such as SHA-256) to generate an event token that represents the activity event vector. Accordingly, the generated token corresponds to a particular user activity event. Moreover, to generate a series of sequential tokens, the user activity sequence system can combine respective tokens from hashing multiple activity event vectors corresponding to an ordered series of user activity events within the content management system.

The user activity sequence system can, in turn, augment the series of sequential tokens with respective tokens for candidate activity events to generate corresponding candidate sequences. Then using the NLM, the user activity sequence system can leverage learned sequences of activity events to rank candidate sequences according to a probability distribution. To learn sequences of activity events, the user activity sequence system can train the NLM to recognize particular sequences of tokens or hash words that are drawn from a finite, fixed vocabulary. In particular, the NLM learns the statistical properties of sequences of tokens (e.g., for many user accounts of a content management system). Once trained, the NLM can predict a next token or hash word given a certain sequence of tokens.

For example, the more probable a candidate sequence is, the more likely a candidate sequence is correct or at least consistent with learned patterns of user activity events within the trained NLM. In these or other embodiments, the user activity sequence system can validate a selected candidate activity event as a most probable candidate sequence (e.g., using performance metrics like click-through rate or more complex evaluations involving perplexity or cross-entropy) to determine a predicted user activity event.

Based on the predicted user activity event, the user activity sequence system can perform one or more actions. For example, the user activity sequence system may perform actions related to user segmentation and grouping, task classification, workflow automation, action suggestions, smart workspace suggestions, smart file syncing, smart file sharing, product discovery, template creation, activity highlights, etc. In some embodiments, the user activity sequence system surfaces content to a graphical user interface of a client device as part of the performed action. The surfaced content may comprise suggested actions for the user device to initiate (e.g., share a file with one or more user accounts). In other embodiments, the surfaced content may comprise a notification that the user activity sequence system performed some task (e.g., granting file-access privileges to one or more user accounts). In other embodiments, the user activity sequence system performs an action without surfacing content to a user device (e.g., automatically syncs a particular file with a particular user device).

As is evident from the above discussion, the user activity sequence system provides several technical advantages over conventional recommendation systems. For example, the user activity sequence system increases accuracy of predicted activity events by leveraging sequence prediction capabilities of NLM to create a user activity sequence model that analyzes a sequence of previous activity events to predict a next event. While conventional systems are not capable of accurately analyzing a vast number of user actions to predict a vast number of potential recommendations or suggestions, the user activity sequence system efficiently accounts for the greater amount of contextual information. Indeed, where the sequence of previous activity events can include activity events related to multiple files and/or multiple user accounts (e.g., a group or enterprise of user accounts), the user activity sequence system can account for significantly greater amounts of context compared to conventional systems. For instance, based on building a "vocabulary" of event tokens and training an NLM to recognize sequences of event tokens, the user activity sequence system can account for vast numbers of user activity events and vast number of potential activity recommendations to accurately determine a predicted activity event. Moreover, by accounting for contextual data in the sequence of previous activity events leading up to a predicted (e.g., next) user activity event, the user activity sequence system improves an accuracy of the predicted user activity event. With increased accuracy of predictions, the user activity sequence system can surface relevant content and recommendations to a user interface on client devices, thereby more efficiently utilizing computer resources and improving a user interface. To illustrate, the user activity sequence system can improve a click-through rate for suggested content on a user interface of an implementing computing device. The improved click-through rate indicates the user activity sequence system provides a more user-friendly user interface with improved relevancy of suggested content.

In addition to improving the accuracy of predicted activity events, the user activity sequence system can also increase model flexibility. For example, the user activity sequence system can leverage a hashing function to build a generalized vocabulary of event tokens based on user activity events for many different users of a content management system. Indeed, while conventional recommendation systems are not suitable for dealing with complex data representations of user activity events within a content management system, the user activity sequence system can transform raw event data into activity event vectors that include various event features, and then the user activity sequence system can hash those vectors to generate event tokens to efficiently generate a representation of a specific user event that includes significant amounts of contextual detail. Based on transforming raw event data into event tokens to create a generalized vocabulary, the user activity sequence system can train a flexible NLM to learn sequences of tokens that broadly apply to users of the content management system. Thus, the user activity sequence system can leverage learned parameters based on user activity events for other user accounts of the content management system in order to make accurate predictions regarding a next activity event for a given user account or group of user accounts. To illustrate this improved model flexibility, the user activity sequence system can make accurate predictions regarding a next activity event for a particular user account even though the particular user account may have a small/short sequence of recent activity events.

As illustrated by the above discussion, the present disclosure utilizes a variety of terms to describe features and advantages of the user activity sequence system. Additional detail is now provided regarding the meaning of some of these terms. Other terms are described more below in relation to the figures. For instance, as used herein, the term "activity event" refers to a digital act performed by a computing device in response to user interaction. In particular, an activity event can include any user action taken on a digital content item associated with a user's account and/or a group of user accounts. For example, an activity event may include one or more accesses, additions, modifications, deletions, annotations, communications, etc. in relation to a digital content item accessible by a user account in a content management system. Specific examples of activity events include computer-executable operations to select, open, add, edit, delete, move, share/unshare, sync/unsync, search for, rename, send or receive an invite to access, star/unstar, restore, comment, reply to a comment, resolve/unresolve a comment, mention a user account, change access privileges, enable/disable commenting or editing, etc. with respect to a digital content item.

As further used herein, the term "digital content item" refers to any digital data in a computing system environment. In particular embodiments, a digital content item can include any of a variety of files, folders, workspaces (e.g., a directory of folders and/or files on a memory/storage device accessible by one or more user accounts over a network), placeholder files, collaborative content items, and the like. For example, a digital content item can include documents, shared files, individual or team (e.g., shared) workspaces, text files (e.g., PDF files, word processing files), audio files, image files, video files, template files, webpages, executable files, binaries, zip files, playlists, albums, email communications, instant messaging communications, social media posts, calendar items, etc.

Relatedly, the term "candidate activity event" refers to a potential digital act (e.g., a next activity event that has not yet occurred) that a computing device may perform in the future responsive to user input. For example, a candidate activity event may be a possible activity event to occur next in a known sequence of previously performed activity events. In these or other embodiments, the user activity sequence system can identify, out of a group of candidate activity events, a particular candidate activity event as the predicted activity event. Accordingly, as used herein, the term "predicted activity event" is an activity event the user activity sequence system determines to be the most probable next event among one or more candidate activity events. In some embodiments, the user activity sequence system can perform one or more actions based on the predicted activity event. Examples of predicted activity events or candidate activity events can include the same or similar events to those mentioned above in relation to an activity event.

Moreover, as used herein, the term "action" refers to the execution of computer acts within a computing environment. For example, the term action can refer to the execution of content management tasks within a content management system. In particular, an action may include digital acts to suggest content to a client device, dynamically store or grant access to digital content items for user accounts in a content management system, and/or create new digital content items for the user accounts in the content management system. For example, the user activity sequence system may perform actions related to user segmentation and grouping, task classification, workflow automation, action suggestions, smart workspace suggestions, smart file syncing, smart file sharing, product discovery, template creation, activity highlights, etc.

Additional detail will now be provided regarding the user activity sequence system in relation to illustrative figures portraying example embodiments and implementations of the user activity sequence system. For example, FIG. 1 illustrates a computing system environment (or "environment") 100 for implementing a user activity sequence system 104 in accordance with one or more embodiments. As shown in FIG. 1, the environment 100 includes server(s) 102, client devices 106a-106n (collectively, client devices 106), an events database 110, and a network 112. Each of the components of the environment 100 can communicate via the network 112, and the network 112 may be any suitable network over which computing devices can communicate. Example networks are discussed in more detail below in relation to FIGS. 9-10.

As shown in FIG. 1, the environment 100 includes the client devices 106. The client devices 106 can be one of a variety of computing devices, including a smartphone, tablet, smart television, desktop computer, laptop computer, virtual reality device, augmented reality device, or other computing device as described in relation to FIG. 9. Although FIG. 1 illustrates multiple client devices 106, in some embodiments the environment 100 can include just one of the client devices 106. The client devices 106 can further communicate with the server(s) 102 via the network 112. For example, the client devices 106 can receive user input and provide information pertaining to the user input to the server(s) 102.

As shown, the client devices 106a-106n include a corresponding client application 108a-108n (collectively, client applications 108). In particular, the client applications 108 may be a web application, a native application installed on the client devices 106 (e.g., a mobile application, a desktop application, etc.), or a cloud-based application where part of the functionality is performed by the server(s) 102. The client applications 108 can present or display information to respective users associated with the client devices 106, including information or content responsive to a predicted activity event. In addition, the respective users can interact with the client applications 108 to provide user input to, for example, view, annotate, edit, send, or share a digital content item.

In these or other embodiments, the client applications 108 and/or the client devices 106 can correspond to specific user accounts (and in some cases, group(s) of user accounts). As used herein, the term "user account" refers to an arrangement in which a user is given personalized access to a computer, website, and/or application. For example, a user account may include privileges, controls, tools, and/or permissions associated with using a business account, an enterprise account, a personal account or any other suitable type of account. Through a user account of a content management system 103 for instance, the user activity sequence system 104 can monitor and track activity events on the client devices 106 and/or the client applications 108.

As illustrated in FIG. 1, the environment 100 includes the server(s) 102. In some embodiments, the server(s) 102 comprises a content server and/or a data collection server. The server(s) 102 can also comprise an application server, a communication server, a web-hosting server, a social networking server, or a digital content management server. In particular, the server(s) 102 may learn, generate, store, receive, and transmit electronic data, such as executable instructions for identifying a sequence of activity events, generating a sequence of activity event vectors and/or event tokens, generating a predicted activity event, and performing an action based on the predicted activity event. For example, the server(s) 102 may receive or obtain raw event data from the events database 110 (e.g., that corresponds to activity events associated with user accounts). Based on the raw event data from the events database 110, the server(s) 102 can use a natural language processing model to predict activity events for user accounts corresponding to the client devices 106 and/or client applications 108. In turn, the server(s) 102 can provide, for display within a user interface of the client applications 108 on the client devices 106, suggested content.

Although FIG. 1 depicts the user activity sequence system 104 located on the server(s) 102, in some embodiments, the user activity sequence system 104 may be implemented by one or more other components of the environment 100 (e.g., by being located entirely or in part at one or more of the other components). For example, user activity sequence system 104 may be implemented by the client devices 106 and/or a third-party device.

As shown in FIG. 1, the user activity sequence system 104 is implemented as part of a content management system 103 located on the server(s) 102. The content management system 103 can organize, manage, and/or execute tasks associated with user accounts, cloud storage, file synchronization, data security/encryption, smart workspaces, etc. For example, the client devices 106 can access respective user accounts associated with the content management system 103 via the client applications 108 to perform activity events with respect to various types of digital content items. In at least one embodiment, the content management system 103 organizes digital content items and stores changes made to the digital content items in response to various activity events. Additional details with respect to the content management system 103 are provided below with reference to FIG. 10.

In some embodiments, though not illustrated in FIG. 1, the environment 100 may have a different arrangement of components and/or may have a different number or set of components altogether. For example, the environment 100 may include a third-party server (e.g., for storing raw event data). As another example, the client devices 106 may communicate directly with the user activity sequence system 104, thereby bypassing the network 112.

Figure 2:
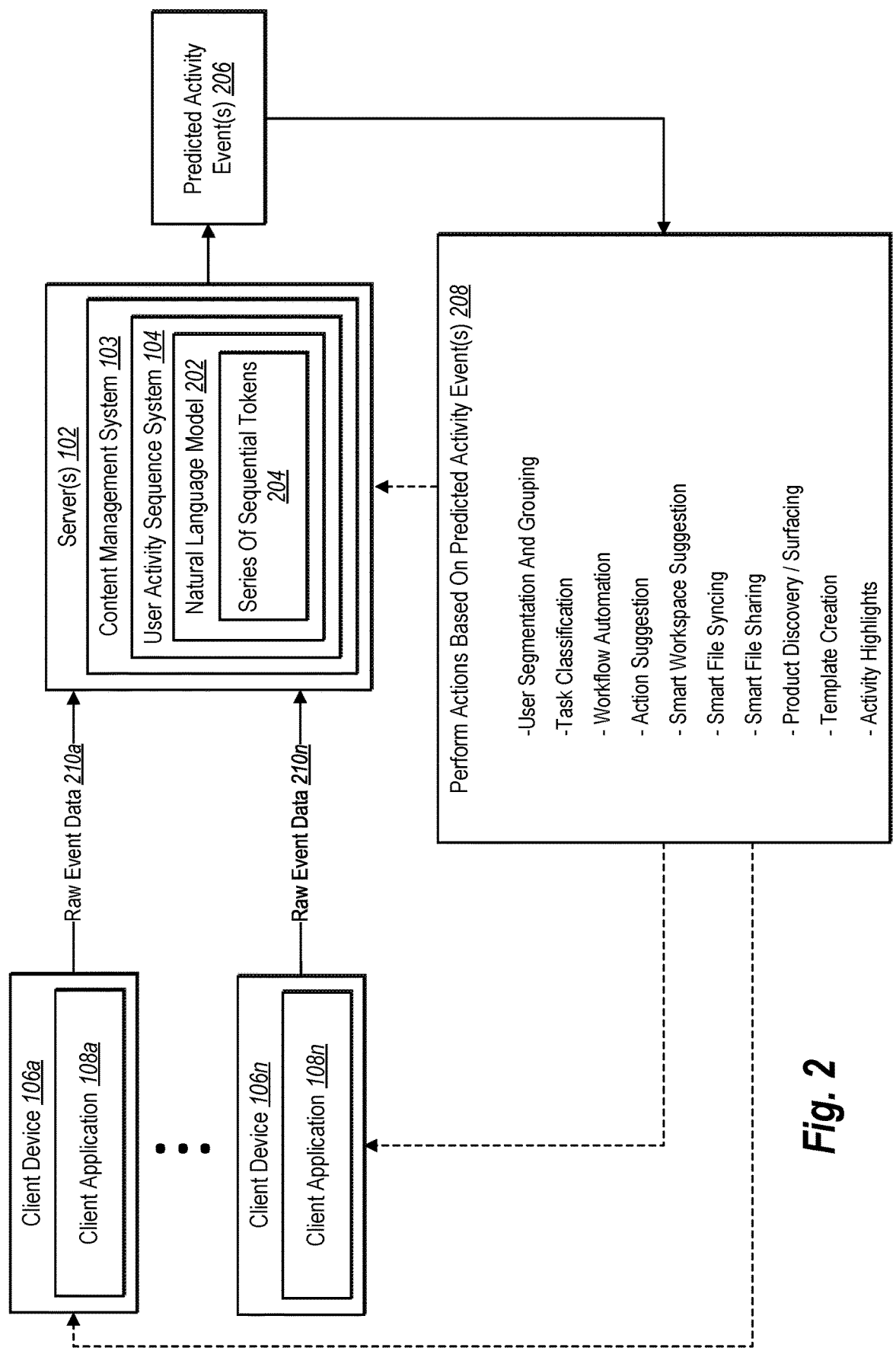
FIG. 2 illustrates a user activity sequence system utilizing a natural language model to generate a predicted activity event in accordance with one or more embodiments.

As mentioned above, the user activity sequence system 104 can predict activity events and, in response, perform an action. FIG. 2 illustrates the user activity sequence system 104 utilizing a natural language model 202 to generate a predicted activity event and perform a corresponding action in accordance with one or more embodiments. As shown, the client devices 106a-106n respectively generate raw event data 210a-210n in response to performance of one or more activity events. As used herein, the term "raw event data" refers to digital information associated with an activity event. Accordingly, the raw event data 210a-210n may include, for example, information regarding digital content item location, name (e.g., filename), size, extension, contents, access privileges (e.g., view/edit/comment privileges), author, group access, timestamps of activities, type of activity (i.e., which specific activity event), user IDs associated with the digital content item, user IDs associated with events corresponding to the digital content item, device IDs or device types associated with events, whether an action was taken on particular digital content item, etc. Raw event data can be in the form of metadata associated with a digital content item (e.g., a file or folder). In addition, raw event data can include information regarding communication between users, channels of communication (e.g., email or instant messaging), calendar items, task list management (e.g., creating tasks, reminding users of tasks, and completing tasks). In essence, any event initiated by a user within the content management system, for example, can result in raw event data that includes descriptive features corresponding to the event.

Based on the raw event data 210a-210n, the user activity sequence system 104 generates respective series of sequential tokens 204 for analysis at the natural language model 202. Generally, the user activity sequence system transforms raw event data by generating activity event vectors with feature embeddings and hashing activity event vectors to generate an event token. The process of generating event tokens and event token sequences is described more below in relation to FIGS. 3-4. The user activity sequence system provides event token sequences to the natural language model 202 to train the language model (as described in further detail below in relation to FIG. 5) to analyze and identify sequence patterns in series of sequential tokens 204.

In one or more embodiments, the natural language model 202 comprises a statistical model. As an example of a statistical model, the natural language model 202 in some embodiments is an n-grams model (e.g., as described in Daniel Jurafsky and James H. Martin, *N-gram Language Models*, In SPEECH AND LANGUAGE PROCESSING, CHAPTER 3 (Oct. 2, 2019), archived at web.stanford. edu/~jurafsky/slp3/3.pdf, hereafter "Jurafsky," the entire contents of which are expressly incorporated herein by reference). In particular, the natural language model 202 may implement, in addition to or alternatively to an n-grams model, one or more smoothing or discounting approaches. Examples of such approaches may include Laplace smoothing, Kneser-Ney smoothing, add-1 smoothing, add-k smoothing, stupid backoff, Lidstone smoothing, etc. as described in Jurafsky. Additionally or alternatively, the natural language model 202 may comprise one or more heuristics or rule-based approaches to analyzing and/or generating the respective series of sequential tokens.

In other embodiments, the natural language model 202 comprises an artificial neural network. For example, in one or more embodiments, the natural language model 202 is a recurrent neural network (RNN). To illustrate, in one or more implementations, the natural language model 202 includes one or more a long short-term memory (LSTM) network layers and/or one or more gated recurrent unit (GRU) network layers. Additionally or alternatively, the natural language model 202 in some embodiments comprises one or more transformer layers and/or neural attention mechanisms (or layers). For example, the natural language model 202 in one or more implementations utilizes bidirectional encoder representations from transformers (e.g., a BERT model as described in Jacob Devlin, Ming-Wei Chang, Kenton Lee, and Kristina Toutanova, Bert: *Pre-training of deep bidirectional transformers for language understanding*, CoRR, abs/1810.04805, 2018, the entire contents of which are expressly incorporated herein by reference).

As additional examples, the natural language model 202 in some embodiments comprises a neural network model, such as word2vec (as described in Tomas Mikolov, Ilya Sutskever, Kai Chen, Greg Corrado, and Jeffrey Dean, *Distributed representations of words and phrases and their compositionality*, In Proceedings of the 26th International Conference on Neural Information Processing Systems—Volume 2, NIPS'13, 2013, pages 3111-3119, USA. Curran Associates Inc., the entire contents of which are expressly incorporated herein by reference) or GloVe (as described in Jeffrey Pennington, Richard Socher, and Christopher, D. Manning, *Glove: Global vectors for word representation*, In EMNLP, 2014, the entire contents of which are expressly incorporated herein by reference).

More generally, however, the term "natural language processing model" refers to a computational model for predicting one or more words (e.g., from a natural language dictionary) given a sequence of preceding words. In particular embodiments, a natural language processing model includes a computational model trained (e.g., designed and optimized based on learned parameters) to predict a next hash word or token given a sequence of preceding tokens corresponding to activity events. For example, a natural language processing model can include statistical models, artificial neural networks, etc. as described above.

As further shown in FIG. 2, based on the token sequence analysis of the trained natural language model 202, the natural language model 202 can determine a predicted activity event(s) 206. For example, the natural language model 202 can generate respective probability scores or rankings for candidate sequences (as described more below in relation to the following figures) that include various different candidate activity events. Using the respective probability scores or rankings, the user activity sequence system 104 can then determine predicted activity events 206 (e.g., as described more in relation to FIG. 4 based on a comparison of the probability scores or rankings to each other and/or to a predetermined threshold).

As is evident from the foregoing discussion, the predicted activity events 206 can inform a number of different scenarios that the user activity sequence system 104 considers when performing an action at act 208. For example, the predicted activity events 206 can include a prediction for what a user will do next on a particular digital content item given the user's activity events associated with the particular digital content item. As another example, the predicted activity events 206 can include an indication of which user account will be the next user account to act on a particular digital content item. In yet another example, the predicted activity events 206 can include a prediction for what activity event will likely occur next and on which digital content item given a sequence of activity events for many digital content items and many users accounts.

At act 208, the user activity sequence system 104 can perform actions based on the predicted activity events 206. FIG. 2 illustrates some example actions at act 208, although additional or alternative actions are within the scope of the present disclosure. Moreover, although the example actions at act 208 illustrated in FIG. 2 include terms like "file," "workspace," and "template," these terms are examples of the myriad digital content items that correspond to the actions at act 208. In these or other embodiments, the user activity sequence system 104 at act 208 may perform a single action based on a given predicted activity event 206. Alternatively, the user activity sequence system 104 at act 208 may perform multiple actions based on a given predicted activity event 206. In either case, the user activity sequence system 104 may, as part of performing an action, transmit data to at least one of the client devices 106, the server(s) 102, and/or the content management system 103.

For instance, in one or more implementations, the user activity sequence system 104 performs an action at act 208 comprising user segmentation and grouping. For this action, the user activity sequence system 104 classifies a user account into one or more user segments based on a likelihood that the predicted activity event corresponds to the one or more user segments. Examples of user segments may include a content creator segment, an influencer segment, a consumer/follower segment, an administrative segment, an executive segment, a client or customer-specific segment, an industry segment, a trial-offer segment, a subscriber segment, a potential churn segment, etc.

In more detail, the user activity sequence system 104 at act 208 can utilize the predicted activity event 206 in combination with a sequence of previous activity events to determine a user segment. For example, utilizing the predicted activity event 206, the user activity sequence system 104 can generate a sequential workflow pattern to more accurately predict a user segment. In these or other embodiments, the user activity sequence system 104 generates a sequential workflow pattern by combining, in chronological order, a particular series of previous activity events followed by the predicted activity event 206.

By generating a sequential workflow pattern that includes the predicted activity event 206, the user activity sequence system 104 can compare the sequential workflow pattern to workflow patterns or activity event sequences associated with specific user segments. Based on the comparison, the user activity sequence system 104 at act 208 can generate a user segment classification. For example, as described more below in relation to FIG. 6, the user activity sequence system 104 utilizes a user segmentation model trained to intelligently predict a user segment based on the predicted activity event 206 and a sequence of previous activity events as inputs. Alternatively, as described below, the user activity sequence system 104 may generate a user segment classification based on a workflow pattern for a user segment matching (or being chronologically similar to) the sequential workflow pattern generated with the predicted activity event 206.

As an example, consider the content creator segment as comprising user accounts which typically follow activity event sequences of "create," "edit," and "share" in this particular order. Thus, in an example scenario, if a predicted activity event 206 is a "sharing" event, the user activity sequence system 104 may group the corresponding user account into the content creator segment if one of the series of sequential tokens 204 represents a previous activity sequence of "create" and then "edit." That is, a typical workflow pattern for the content creator segment matches the sequential workflow pattern generated with the predicted activity event 206. In this case, the user activity sequence system 104 may send user segmentation/grouping data regarding the user account (e.g., associated with the client device 106a and/or the client application 108a) to the content management system 103 and/or the server(s) 102. Additionally or alternatively, the user activity sequence system 104 may send a notification to the client device 106a via the client application 108a indicating that the user activity sequence system 104 has identified this user account as a "content creator."

For the action of task classification at act 208, the user activity sequence system 104 utilizes a predicted activity event 206 for a given user account in order to determine a task that the user account is trying to do. For instance, using the above example for the content creator segment, the user activity sequence system 104 may determine that the user account associated with the client device 106a and/or the client application 108a is in the process of performing a task related to "sharing." For instance, the user activity sequence system 104 may identify, based on the predicted activity event 206, that the client device 106a is preparing to send an electronic invitation to other user accounts for editing a group document. In this case, the user activity sequence system 104 may surface, at the client device 106a, an electronic invitation for sending to and/or populating with one or more user accounts. In some embodiments, the user activity sequence system 104 may surface the electronic invitation in response to a user input at a "share" link in the client application 108a.

As another example of an action at act 208, the user activity sequence system 104 can perform workflow automation. Slightly different from task classification, the predicted activity events 206 can provide insight regarding what a user account is likely going to begin next as part of some workflow. By contrast, in task classification, the user account is already in the process of performing a user activity event, albeit not yet executed. Thus, workflow automation focuses more on what the user account is going to do versus what the user account is trying to do.

To illustrate with the above "share" example for the predicted activity event 206, the user activity sequence system 104 may perform workflow automation as an automatic response to determining the predicted activity event 206. For example, the user activity sequence system 104 may surface a prompt in the client application 108a to share the document after the user activity sequence system 104 receives an indication that edits to a new/opened document at the client device 106a have been saved in the content management system 103. Thus, the sequential acts of saving edits after opening/creating a document (alone without a prior indication to "share" the document) can trigger the user activity sequence system 104 to surface the "share" prompt in accordance with the predicted activity event 206 as the next step the user account will likely take.

In some embodiments, to improve training and/or evaluation processes, the user activity sequence system 104 may apply a label to the raw event data and/or the series of sequential tokens 204 to indicate whether the automated workflow was actually implemented by the user account. By observing and tagging the raw event data and/or the series of sequential tokens 204, the user activity sequence system 104 can learn to better recognize cyclical/periodic patterns in user activity events for workflow automation. To do so, the user activity sequence system 104 can utilize the labels or tags (e.g., as part of a training process described below in relation to FIG. 5) in generating token sequences for populating the corpus of series of sequential tokens 510 to apply to the natural language model 202. Subsequently, in executing additional training iterations based on observed and tagged data as just described, the user activity sequence system 104 can further improve or fine-tune the natural language model 202.

In one or more implementations, the user activity sequence system 104 accounts for activity events on multiple computing devices (e.g., a desktop computing device and a mobile computing device) associated with a user account when determining the predicted activity event 206. Thus, in an example scenario for workflow automation, the user activity sequence system 104 may perform the appropriate action based on the predicted activity event 206 indicating which computing device the user activity sequence system 104 anticipates the user will continue to use or else switch to. For example, where a user account initiated a workflow on a mobile device (e.g., to perform a mobile scan), the user activity sequence system 104 may generate workflow automation suggestions on the mobile device related to the mobile scan notwithstanding recent activity events on the desktop computing device.

In yet another example of an action at act 208, the user activity sequence system 104 can surface action suggestions. An action suggestion (or more generally, a suggestion or recommendation) may comprise one or more prompts, recommendations, calls to action, requests, etc. in relation to a predicted activity event. For example, the user activity sequence system 104 may create a calendar invite, generate a digital reminder or a task list, draft a follow-up communication, etc. based on the predicted activity event 206. Additionally or alternatively, in some embodiments an action suggestion may form part of one or more other actions described herein (e.g., task classification, workflow automation, etc.). For example, the user activity sequence system 104 may suggest, as part of an automated workflow, a next digital content item to open (e.g., download, sync, access, edit, etc.). As another example of an action suggestion as part of an automated workflow, the user activity sequence system 104 may suggest a next activity to view (e.g., among activity highlights pertaining to digital activity in a digital content item accessible by one or more user accounts).

In an example scenario, a group of user accounts (e.g., a first user account associated with the client device 106a and a second user account associated with the client device 106n) share a digital content item accessible by the group of user accounts. In this example, the user activity sequence system 104 can provide corresponding (e.g., different) action suggestions to each of the user accounts in the group. For example, the user activity sequence system 104 may generate a first action suggestion based on a first predicted activity event for the first client device 106a, and a second action suggestion based on a second predicted activity event for the second client device 106n. In these or other embodiments, the first predicted activity event and/or the second predicted activity event for the respective first and second client devices 106a, 106n may depend on some or all activity events associated with the user accounts of the group of user accounts. In one or more embodiments, however, the user activity sequence system 104 limits the relevant activity events of the group of user accounts to activity events related to the shared digital content item. In turn, the user activity sequence system 104 may surface the respective action suggestions to the corresponding first and second client devices 106a, 106n. In some embodiments, the respective action suggestions as surfaced to the corresponding client devices 106a, 106n may include different user interfaces and user experiences.

As a further example of an action at act 208, the user activity sequence system 104 can generate smart suggestions for digital content items (e.g., workspace suggestions). For example, the user activity sequence system 104 may suggest that a user account share a digital content item with another user account based on one or more of the predicted activity events 206. Additionally or alternatively, the user activity sequence system 104 may intelligently arrange (or suggest) a workspace, such as a particular location and/or ordering of digital content items (e.g., files). To illustrate, the user activity sequence system 104 may cluster and/or prioritize digital content items within a shared workspace based on a level of collaboration (e.g., according to a heuristic approach that, for instance, accounts for a number of comments, edits, etc. from different user accounts).

For instance, the user activity sequence system 104 may prioritize (e.g., a listing order of) a more-collaborated digital content item over a less-collaborated digital content item. Similarly, the user activity sequence system 104 may prioritize a listing arrangement of a team workspace as viewable by a first user account differently than viewable by a second user account in the group. As an example, the user activity sequence system 104 may prioritize, for the first user account, one or more personal documents (e.g., notes) in the shared workspace associated with the first user account over personal documents in the shared workspace associated with the second user account.

As another example, the user activity sequence system 104 may cluster more-collaborated digital content items with other more-collaborated digital content items, and less-collaborated digital content items with other less-collaborated digital content items. Likewise, in some implementations, the user activity sequence system 104 may cluster digital content items of a team workspace as viewable by a first user account differently than viewable by a second user account in the group. As an example, the user activity sequence system 104 may cluster, for the first user account, one or more personal documents (e.g., notes) in the shared workspace associated with the first user account as a separate cluster from other documents in the shared workspace.

In yet another example of a smart workspace suggestion, the user activity sequence system 104 may suggest where a digital content item should be moved to or otherwise placed in a workspace based on the predicted activity events 206. In this example, at least one of the series of sequential tokens 204 for one of the client devices 106 may reflect the various user activity events that the user activity sequence system 104 tracked on a workspace level (e.g., a folder level).

Additionally or alternatively, the user activity sequence system 104 may perform an action at act 208 that includes smart syncing for digital content items (e.g., smart file syncing) based on the predicted activity event 206. In these or other embodiments of an action at act 208, the user activity sequence system 104 can dynamically change a browsing experience for a user account as an associated client device navigates (e.g., scrolls through) a workspace presented via a client application. Additionally or alternatively, the user activity sequence system 104 can dynamically change a browsing experience for a user account as an associated sequence of activity events changes (e.g., based on an updated or next predicted activity event 206). For example, the user activity sequence system 104 may cluster or prioritize digital content items within a shared workspace based on a level of collaboration or type of document as mentioned above. Additionally or alternatively, the user activity sequence system 104 may cluster or prioritize digital content items within a shared workspace based on a similarity between respective activity event sequences associated with the digital content items (e.g., according to a machine-learning model or heuristic approach). In these or other embodiments, the user activity sequence system 104 may cluster or prioritize digital content items within a shared workspace based on topic of content included within the digital content items.

In some embodiments, the smart file syncing at act 208 may include the user activity sequence system 104 intelligently offloading content from memory/storage of the client device to one or more memory/storage devices at the server(s) 102 based on the predicted activity events 206. Likewise, the smart file syncing at act 208 may include the user activity sequence system 104 intelligently downloading or syncing content onto memory/storage of the client device from one or more memory/storage devices at the server(s) 102 based on the predicted activity events 206.

For example, the predicted activity event 206 may indicate that a user account has completed work on a digital content item and/or has moved onto a new/different digital content item. Therefore, the user activity sequence system 104 may infer that the user account is likely finished editing/accessing the digital content item for at least the short-term future. In this case, the user activity sequence system 104 may offload the completed digital content item for storage at the server(s) 102. Thus, the user activity sequence system 104 can improve the functioning of a computing device by dynamically freeing up storage space. As another example, the predicted activity event 206 may indicate that a user account will begin to work on a digital content item (e.g., where the predicted activity event 206 is accessing a new group document that the user account was invited to edit). In this case, the user activity sequence system 104 may automatically sync the digital content item to the client device (e.g., before the user account proceeds to access the group document). This allows a client device to go offline before retrieving/accessing the group document, thereby reducing a number of user inputs otherwise required at one or more user interfaces to navigate the client application and download the group document.

In another example action at act 208, the user activity sequence system 104 generates smart sharing suggestions for digital content items (e.g., file sharing suggestions) based on the predicted activity event 206. For instance, similar to some smart workspace suggestions, smart file sharing suggestions may include the user activity sequence system 104 suggesting that a user account share (e.g., grant one or more types of access privileges to) a digital content item with another user account based on one or more of the predicted activity events 206. As an example, the predicted activity event 206 may be to "share" a file based on saved edits to certain file content or types of files, such as a signature document requiring an electronic signature. Thus, after saving edits to populate fields of the signature document, the user activity sequence system 104 may, based on the predicted activity event 206 to share the signature document, automatically surface a prompt at a client device to share the saved signature document. Accordingly, the user activity sequence system 104 can account for numerous combinations of user activity events performed on certain types of digital content items in order to intelligently suggest sharing of digital content items with a user account, groups of user accounts, etc.

In another example of smart sharing of digital content items, the user activity sequence system 104 may surface to a user account having admin privileges, a suggestion to add a particular user account to a group of user accounts based on the predicted activity event 206. For example, where the predicted activity event 206 for an admin user account is to share a particular document with a group of user accounts, the user activity sequence system 104 may remind or suggest that the admin user account add an uninvited user account to the shared workspace or shared file. This scenario is advantageous, for instance, when the uninvited user account may typically be included in such sharing of digital content items but is currently omitted (e.g., due to incidental omission of the admin).

In one or more embodiments, an action at act 208 includes product discovery/surfacing. For example, based on the predicted activity events 206, the user activity sequence system 104 can present products and software tools for user browsing and discovery within a client application. Using an above example in which the user activity sequence system 104 determines that the user account corresponds to a content creator segment based on the predicted activity event 206, the user activity sequence system 104 can tailor a presentation of the surfaced products and software tools to apply to content creation. In another example in which the user activity sequence system 104 generates a workflow suggestion for contract workflows, the user activity sequence system 104 may also surface a trial offer for a particular product related to contract workflows.

Similarly, for the action of template creation at act 208, the user activity sequence system 104 can suggest an auto creation of templates based on the predicted activity events 206. For example, where the predicted activity event 206 indicates the user account is initiating a new contract-based project, the user activity sequence system 104 may suggest one or more of the previous digital content items (e.g., documents) as a template. Additionally or alternatively, the user activity sequence system 104 may auto populate one or more entry fields of the previous documents to reflect content for the next project (e.g., by mining digital content item data, one or more electronic communications, etc.).

In yet another example of an action at act 208, the user activity sequence system 104 can generate one or more activity highlights based on the predicted activity events 206. For example, based on a particular predicted activity event 206, the user activity sequence system 104 may suggest and/or summarize a next activity that the user account should review. To illustrate, the user activity sequence system 104 may prioritize and/or focus on highlights of various user account activities performed within a group workspace based on the particular predicted activity event 206 (e.g., to indicate a digital content item that the user recently worked on or is predicted to work on next has synced, been edited by another user account, etc.). In another example, the user activity sequence system 104 may prioritize activity highlights for activity events between user accounts that collaborate together more frequently than with other user accounts.

Figure 3:
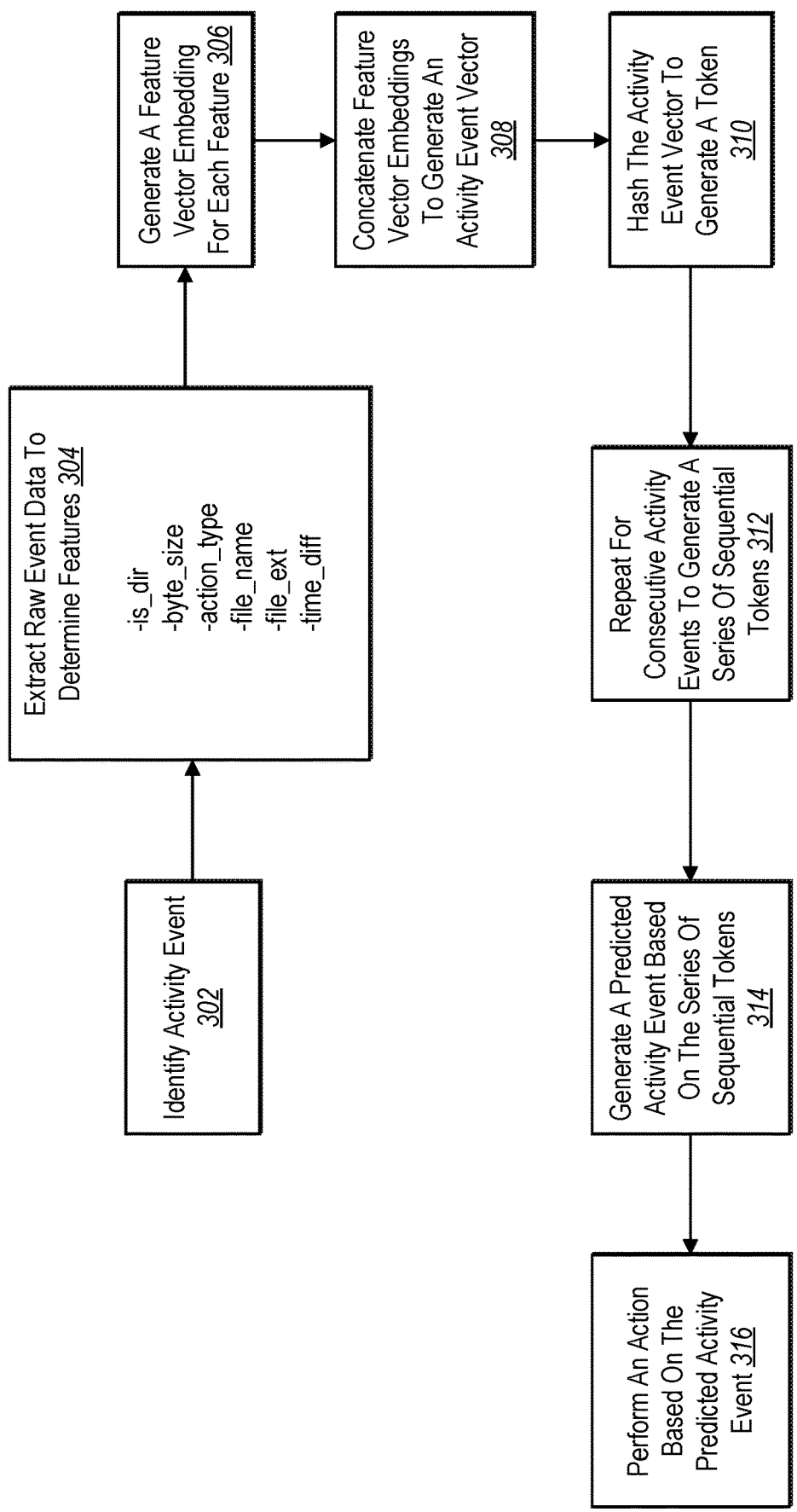
FIG. 3 illustrates a user activity sequence system generating a series of sequential tokens to predict an activity event in accordance with one or more embodiments.

As mentioned above, the user activity sequence system 104 can implement token generation for analyzing activity event sequences. FIG. 3 illustrates the user activity sequence system 104 generating a series of sequential tokens to predict an activity event and perform a corresponding action in accordance with one or more embodiments. As shown in FIG. 3, the user activity sequence system 104 at act 302 identifies an activity event. For clarity of illustration and discussion, the activity event identified at act 302 may be referred to as a single activity event corresponding to a user account. To identify the activity event at act 302, the user activity sequence system 104 receives and processes, from a client device associated with the user account, an indication of user input at the client device to perform an act on or within a digital content item accessible by the user account. The indication of the user input may include a data packet with raw event data about the act performed with respect to the digital content item. Additionally or alternatively, the data packet may include computer-executable instructions (e.g., a digital request) for the content management system 103 to perform some content management task (e.g., sync a digital content item, share a digital content item, etc.).

In one or more implementations, act 302 to identify an activity event may include the user activity sequence system 104 sending a request for or otherwise obtaining at least a portion of the raw event data for an activity event from an events database and/or from the client device. In these or other embodiments, the user activity sequence system 104 may limit the applicable activity events to a threshold time period (e.g., the past three days, seven days, thirty days, etc.) and/or to a threshold number of activity events (e.g., fifty, one hundred, one thousand, etc.). Accordingly, in some embodiments, identifying an activity event at act 302 may include a preliminary analysis of a specific feature of the raw event data for an activity event (e.g., a timestamp or other temporal feature) to indicate whether an activity event occurred within the threshold time period. Additionally or alternatively, identifying an activity event at act 302 may include using the timestamp or other temporal feature of the raw event data to indicate a chronological position of an activity event within a sequence of activity events. Accordingly, in some embodiments, the user activity sequence system 104 performs at least part of act 304 (described below) simultaneously to or as part of act 302.

At act 304, the user activity sequence system 104 extracts raw event data about the activity event identified at act 302. In some embodiments, the user activity sequence system 104 extracts raw event data from an events database that stores raw event data for many user accounts of the content management system 103. In these or other embodiments, extracting the raw event data at act 304 comprises selecting certain features as a relevant subset of the raw event data corresponding to the identified activity event. For example, based on the extracted raw event data at act 304, the user activity sequence system 104 can determine various applicable features of the raw event data, such as a user account identifier, a computing device identifier (or a source identifier), a device type, a byte size, an action type, a digital content item name, a digital content item extension, a timestamp differential, an absolute timestamp, a ranking, content or type of content within a digital content item, whether an action was taken on a digital content item, other file metadata, a number of collaborators, a number of interacting collaborators, a number of digital content items that an action was taken on, etc.

In some embodiments, to identify file content as part of extracting raw event data, the user activity sequence system 104 utilizes a classifier. The classifier may include one or more neural networks (e.g., a convolutional neural network trained to identify document objects within a digital content item). In addition, the classifier may utilize optical character recognition, optical word recognition, etc. to identify textual objects.

At act 306, the user activity sequence system 104 can generate a feature vector embedding for each feature extracted at act 304. In some embodiments, generating a feature vector embedding for a given feature comprises converting a format of the features into a vector format. For instance, the user activity sequence system 104 may convert the following example features as follows: the "is_dir" feature from a Boolean value to an integer value (e.g., zero or one as a binary 1-dimensional vector or integer); the "byte_size" feature from a long value to a $\log_{10}$ value (e.g., as a one-hot encoded 10-dimensional integer vector or as the floor(log(size)) as an integer value); the "action_type" feature from an integer value (e.g., less than 80) to a base 3 value (e.g., as a four-dimensional integer vector, or else an integer if left as-is); the "file_name" feature from a text value to a filename character-distribution-based embedding (e.g., as a five-dimensional or ten-dimensional float or integer vector); the "file_ext" feature from a text value to an extension embedding (e.g., as a six-dimensional or ten-dimensional integer or float vector); and the "time_diff" feature from a seconds value to a number of months, weeks, days, and hours (e.g., as a four-dimensional integer vector).

In at least some embodiments, however, one or more features need not be converted to a different format. For example, some features may comprise a format as a vector embedding that is the same format included in the raw event data. For instance, in some implementations, the action_type feature is left as-is. Similarly, in some implementations, the user activity sequence system 104 may leave a timestamp feature as-is (e.g., where an order of timestamps represents a timing such that a smaller timestamp value occurs before a larger timestamp value in a sequence). Additionally, in some embodiments, the feature vector embedding can comprise a number of different bins (e.g., hash-function bins that a hash-word or token is slotted into). For example, the filename embedding and/or the file extension embedding mentioned above may each include ten bins.

At act 308, the user activity sequence system 104 can concatenate feature vector embeddings to generate an activity event vector that corresponds to one activity event identified at act 302. For example, the user activity sequence system 104 may combine the feature embeddings from act 306 into a thirty-dimensional float vector (albeit other size dimensions and types of vectors are contemplated within the scope of the present disclosure). In another example, the activity event vector is a several-hundred-dimensional float vector (e.g., that accounts for a file-content embedding that represents actual digital content identified within one or more digital content items).

At act 310, the user activity sequence system 104 can utilize a hashing function to hash the activity event vector from act 308. In hashing the activity event vector, the user activity sequence system 104 can generate a hash word or token that represents the activity event vector. In these or other embodiments, the hashing function comprises a Secure Hash Algorithm 2, such as SHA-224, SHA-256, SHA-384, SHA-512, SHA-512/224, or SHA-512/256. In other implementations, the user activity sequence system 104 can utilize a different hashing function at act 310 to generate a token for the activity event vector from act 308.

In one or more embodiments, the user activity sequence system 104 utilizes a hashing function to selectively hash only a portion of the activity event vector at act 310. For example, the user activity sequence system 104 may generate a hash word or token for the filename feature embedding, the filename extension embedding, and/or other feature embeddings. In this example, however, the user activity sequence system 104 leaves one or more other feature embeddings untokenized. This approach may be advantageous (e.g., in terms of increasing computational speed or reducing computational overhead) when certain portions of the activity event vector are already limited in the number of possible permutations. Accordingly, in some embodiments, the user activity sequence system 104 omits act 310 all together (e.g., when certain feature embeddings are not relevant). For instance, when a filename feature embedding is not part of the activity event vector, the user activity sequence system 104 may omit act 310 because other portions of the activity event vector are already limited in the number of possible permutations.

At act 312, the user activity sequence system 104 can repeat the foregoing acts and algorithms just discussed for other activity events in a sequence of activity events. Although act 312 is illustrated as a discrete step (e.g., for clarity of the previous discussion), in some embodiments, each of the foregoing acts 302-310 are performed with respect to multiple activity events. That is, the user activity sequence system 104 may identify multiple activity events (e.g., a sequence of activity events at act 302), and the user activity sequence system 104 performs the following acts 304-310 with respect to each of the identified activity events. In this manner, the user activity sequence system 104 can generate (at about the same time or in a batch of processing steps) a series of sequential tokens corresponding to separate, consecutive activity events. In other embodiments, the user activity sequence system 104 may generate a first token corresponding to a first activity event, and at a later time, generate a second token corresponding to a second activity event (e.g., a next activity event). Thus, in some embodiments, the user activity sequence system 104 may perform the foregoing acts 302-310 on a rolling basis (e.g., as the system identifies a new activity event) until the user activity sequence system 104 completes a series of sequential tokens.

In some embodiments, the user activity sequence system 104 generates the series of sequential tokens at act 312 such that the series of sequential tokens forms a particular structure. In one or more implementations utilizing an n-gram model, the user activity sequence system 104 may construct the series of sequential tokens to form an n-gram (e.g., a bigram, a trigram, a four-gram, and so forth as described in Jurafsky.

In at least one embodiment, the user activity sequence system 104 constructs the series of sequential tokens at act 312 to form a sentence. For example, the user activity sequence system 104 may construct the series of sequential tokens to comprise the tokens that correspond to activity events occurring within a predetermined time period or between periods of inactivity (e.g., a threshold timeout period, such as thirty minutes, sixty minutes, two hours, five hours, etc.). For instance, the sentence of sequential tokens may correspond to a one hour time period of activity events if occurring between a four-hour break and a two-hour break of inactivity. Additionally, in some embodiments, the user activity sequence system 104 limits the number of sequential tokens in a sentence to a predetermined threshold (e.g., less than or equal to one hundred tokens). In these or other embodiments, the threshold timeout period of inactivity for constructing one or more sentences of sequential tokens is a learned/tunable parameter of the natural language model 202, a configurable parameter, and/or an input feature (e.g., similar to "time_diff") that is represented in an activity event vector.

Additionally or alternatively, the user activity sequence system 104 may generate paragraphs or documents of sequential tokens (e.g., comprising multiple sentences of tokens). In some embodiments, a paragraph or document of sequential tokens corresponds to longer or more general periods of activity events (e.g., activity events for a day, week, month, etc.).

In some cases, generating paragraphs or documents comprising multiple sentences of sequential tokens allows the user activity sequence system 104 to provide more context when predicting a next activity event. For example, if a document represents a user's activity events for a given day, the user activity sequence system 104 can more accurately predict a next activity event based on a document's worth of user activity events than perhaps the last sentence or two (e.g., representing 1 hour of user activity events) viewed in isolation. Thus, in at least some embodiments, the user activity sequence system 104 utilizes sentence, paragraph, and/or document structure corresponding to predetermined or threshold time periods for arranging sequential tokens. In this manner, the user activity sequence system 104 can dynamically expand or isolate the number of sequential tokens providing context for predicting a next user activity event (e.g., as described more below in relation to act 314).

At act 314, the user activity sequence system 104 can generate a predicted activity event based on the series of sequential tokens. For example, based on the semantic hash-word context provided by the series of sequential tokens, the natural language model 202 can, as described more below in relation to FIG. 4, figuratively complete a series of sequential tokens (e.g., complete a sentence or document of tokens) for one or more user accounts.

Alternatively, at act 314, the user activity sequence system 104 may generate a predicted activity event without the series of sequential tokens. For example, in one or more embodiments where the natural language model 202 is a neural network, the user activity sequence system 104 generate a predicted activity event based on a series of activity event vectors (e.g., as generated up through act 308). In this example, no hashing or tokens are implemented as the natural language model 202 in the form of a neural network utilizes the series of activity event vectors as an input feature to output a predicted activity event.

In some embodiments, the user activity sequence system 104 utilizes a particular portion of the series of sequential tokens (e.g., a sentence, a paragraph, or a document) to generate the predicted activity event at act 314. For example, the natural language model 202 may attempt to use a first portion (e.g., a sentence) of the series of sequential tokens to generate the predicted activity event. If the user activity sequence system 104 cannot identify a predicted activity event based on the first portion, the user activity sequence system 104 may determine the predicted activity event utilizing a second portion (e.g., a paragraph or document) of the series of sequential tokens. In this case, the natural language model 202 leverages more context (e.g., more sequential tokens) to determine the predicted activity event. This approach may be advantageous in scenarios where the user activity sequence system 104 generates LM scores (described below in relation to FIG. 4) that each fall below a threshold for selecting a candidate activity event as the predicted activity event.

In another example, the user activity sequence system 104 utilizes multiple portions of the series of sequential tokens (e.g., a sentence, a paragraph, and/or a document) to generate the predicted activity event at act 314. For example, the natural language model 202 may generate a first predicted activity event based on a first portion (e.g., a sentence) of the series of sequential tokens, a second predicted activity event based on a second portion (e.g., a paragraph) of the series of sequential tokens, and so forth. In turn, the natural language model 202 can compare the predicted activity events generated based on the different portions of the series of sequential tokens. Based on the comparison, the natural language model 202 can confirm the accuracy of the predicted activity event and/or add a confidence score to the predicted activity event. In some cases, the comparison may indicate the first predicted activity event and the second predicted activity event differ. In this case, the user activity sequence system 104 may select both as the predicted activity events or else select only one (e.g., where LM scores, the amount of token context, etc. can impact the selection).

At act 316, the user activity sequence system 104 can perform an action based on the predicted activity event. For example, as described above in relation to FIG. 2, the user activity sequence system 104 can perform one or more actions with respect to user accounts and/or digital content items, such as user segmentation and grouping, task classification, workflow automation, action suggestions, smart workspace suggestions, smart file syncing, smart file sharing, product discovery, template creation, activity highlights, etc.

In these or other embodiments, the acts and algorithms of FIG. 3 may be modified to include additional or alternative acts and algorithms than just described. For example, in some embodiments, the user activity sequence system 104 encodes and/or decodes additional or alternative features than described above to generate an activity event vector and/or a token. As another example embodiment, the user activity sequence system 104 employs various rules or heuristics to improve one or more of the above acts outlined in FIG. 3. To illustrate, the user activity sequence system 104 can limit new tokens (e.g., to reduce redundancies) to instances where at least one of two things change: i) an action_type on the same file changes or ii) the file_name or id changes.

Figure 4:
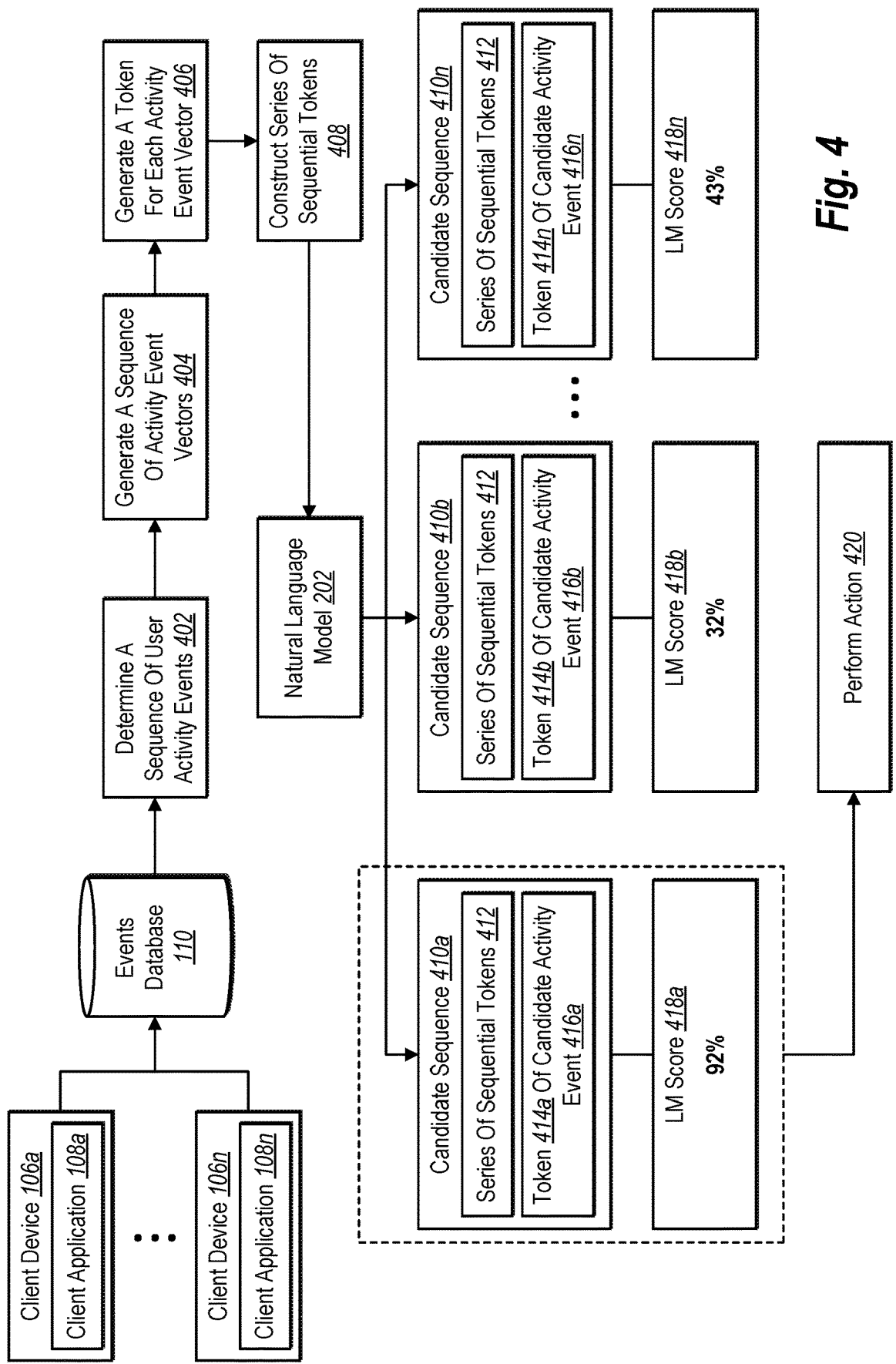
FIG. 4 illustrates a user activity sequence system utilizing a natural language model to generate LM scores for predicting an activity event in accordance with one or more embodiments.

As mentioned above, the user activity sequence system 104 can select a predicted activity event based on probability scores or ranking scores of candidate sequences (hereafter referred to as "LM scores" or language model scores). FIG. 4 illustrates the user activity sequence system 104 utilizing the natural language model 202 to generate LM scores for predicting an activity event in accordance with one or more embodiments. As shown in FIG. 4, the user activity sequence system 104 stores, at the events database 110, raw event data generated by client devices 106. Based on the raw event data, the user activity sequence system 104 at act 402 determines a sequence of activity events. For example, as described above in relation to FIG. 3, the user activity sequence system 104 may use the timestamp or other temporal feature of the raw event data to indicate a chronological position of an activity event within a sequence of activity events.

At act 404, the user activity sequence system 104 can generate a sequence of activity event vectors. For example, as described above in relation to FIG. 3, the user activity sequence system 104 can generate a feature vector embedding for each feature extracted in the raw data. In turn, the user activity sequence system 104 can concatenate feature vector embeddings to generate an activity event vector. The user activity sequence system 104 can, of course, perform the same steps with respect to consecutive activity events to generate a sequence of activity event vectors.

In some embodiments, act 404 to generate a sequence of activity event vectors includes analyzing a time-difference feature embedding (e.g., the "time_diff" feature vector embedding) for each activity event vector. For example, each time-difference feature embedding represents a respective timestamp differential relative to one or more consecutive activity events determined at act 402. Accordingly, the user activity sequence system 104 can then group, into the sequence of activity event vectors, activity event vectors that comprise a feature embedding of a timestamp differential less than or equal to an activity timeout threshold (e.g., the threshold timeout period of inactivity described above in relation to act 312 of FIG. 3).

At act 406, the user activity sequence system 104 can generate a token for each activity event vector in the sequence of activity event vectors. For example, as described above in relation to FIG. 3, the user activity sequence system 104 can utilize a hashing function to hash an activity event vector, thereby generating a token for the activity event vector. By respectively hashing each activity event vector, the user activity sequence system 104 can then construct the series of sequential tokens as indicated at act 408. As also described above, the series of sequential tokens can take a variety of forms (e.g., n-grams, sentences of tokens, documents of tokens). Alternatively, if the natural language model 202 is a neural network, the user activity sequence system 104 feeds a different input to the natural language model 202 (e.g., the series of activity event vectors instead of the series of sequential tokens).

Based on the input to the natural language model 202, the user activity sequence system 104 can generate LM scores 418a-418n (e.g., that range between 0% and 100%, or in some cases above or below this range) for candidate sequences 410a-410n. To do so, the user activity sequence system 104 generates the candidate sequences 410a-410n. As shown in FIG. 4, each of the candidate sequences 410a-410n comprise a series of sequential tokens 412, which is the series of sequential tokens generated at act 408. Accordingly, the series of sequential tokens 412 corresponds to the relevant context (e.g., the previous activity events for one or more user accounts associated with the client devices 106) that the natural language model 202 considers. Thus, the series of sequential tokens 412 is common to each of the candidate sequences 410a-410n.

In addition, the user activity sequence system 104 adds, to each of the candidate sequences 410a-410n, respective tokens 414a-414n of candidate activity events 416a-416n. The tokens 414a-414n of candidate activity events 416a-416n distinguish each of the candidate sequences 410a-410n. In these or other embodiments, the user activity sequence system 104 generates the respective tokens 414a-414n of candidate activity events 416a-416n by tokenizing activity events identified from the events database 110 (e.g., in a same or similar manner as described above in relation to FIG. 3 and acts 402-408). In some embodiments, the user activity sequence system 104 selects, for the candidate activity events 416a-416n, some or all of the previous user activity events for a given user account. Additionally or alternatively, the user activity sequence system 104 selects, for the candidate activity events 416a-416n, user activity events corresponding to other user accounts (e.g., other user accounts in a group with the user account, other user accounts associated with a same user segment, etc.). In other embodiments, the user activity sequence system 104 selects, for the candidate activity events 416a-416n, one or more activity events from the events database 110 at random and/or one or more activity events as a quality control/test marker.

With the candidate sequences 410a-410n generated, the natural language model 202 can generate the corresponding LM scores 418a-418b. For example, based on learned parameters generated by training on a corpus of series of sequential tokens as described more below in relation to FIG. 5, the user activity sequence system 104 can generate the LM scores 418a-418n as indicative of a likelihood that a candidate sequence is the correct sequence. For instance, the natural language model 202 generates the LM score 418a of 92% for the candidate sequence 410a, the LM score 418*b* of 32% for the candidate sequence 410*b*, and the LM score 418*n* of 43% for the candidate sequence 410*n*. In these or other embodiments, the user activity sequence system 104 can rank the LM scores 418*a*-418*n*, analyze a distribution of the LM scores 418*a*-418*n*, among myriad other processes. Moreover, the user activity sequence system 104 can select, as the most probable correct sequence, the candidate sequence associated with the highest LM score (in this case, the LM score 418*a* of 92%).

Additionally or alternatively, the user activity sequence system 104 can select multiple candidate sequences to predict multiple activity events. For example, in the event that the natural language model 202 generates LM scores for multiple candidate sequences that meet or exceed a threshold LM score, the user activity sequence system 104 may identify each of the multiple candidate sequences as the predicted activity events. In this manner, the user activity sequence system 104 may predict that a user will perform multiple (e.g., related) user activities, such as opening three specific files.

Based on the user activity sequence system 104 selecting the candidate sequence 410*a* as the most probable candidate sequence, the user activity sequence system 104 can select the candidate activity event 416*a* as the predicted activity event. In turn, the user activity sequence system 104 can perform an action at act 420 based on the predicted activity event (e.g., as described more above in relation to act 208 of FIG. 2). In some cases involving multiple predicted activity events, the user activity sequence system 104 likewise can perform multiple actions. For example, in response to generating three discrete predicted activity events corresponding to a user opening three different files, the user activity sequence system 104 may provide three discrete, corresponding suggestions to a client device of the user to share the three different files.

Figure 5:
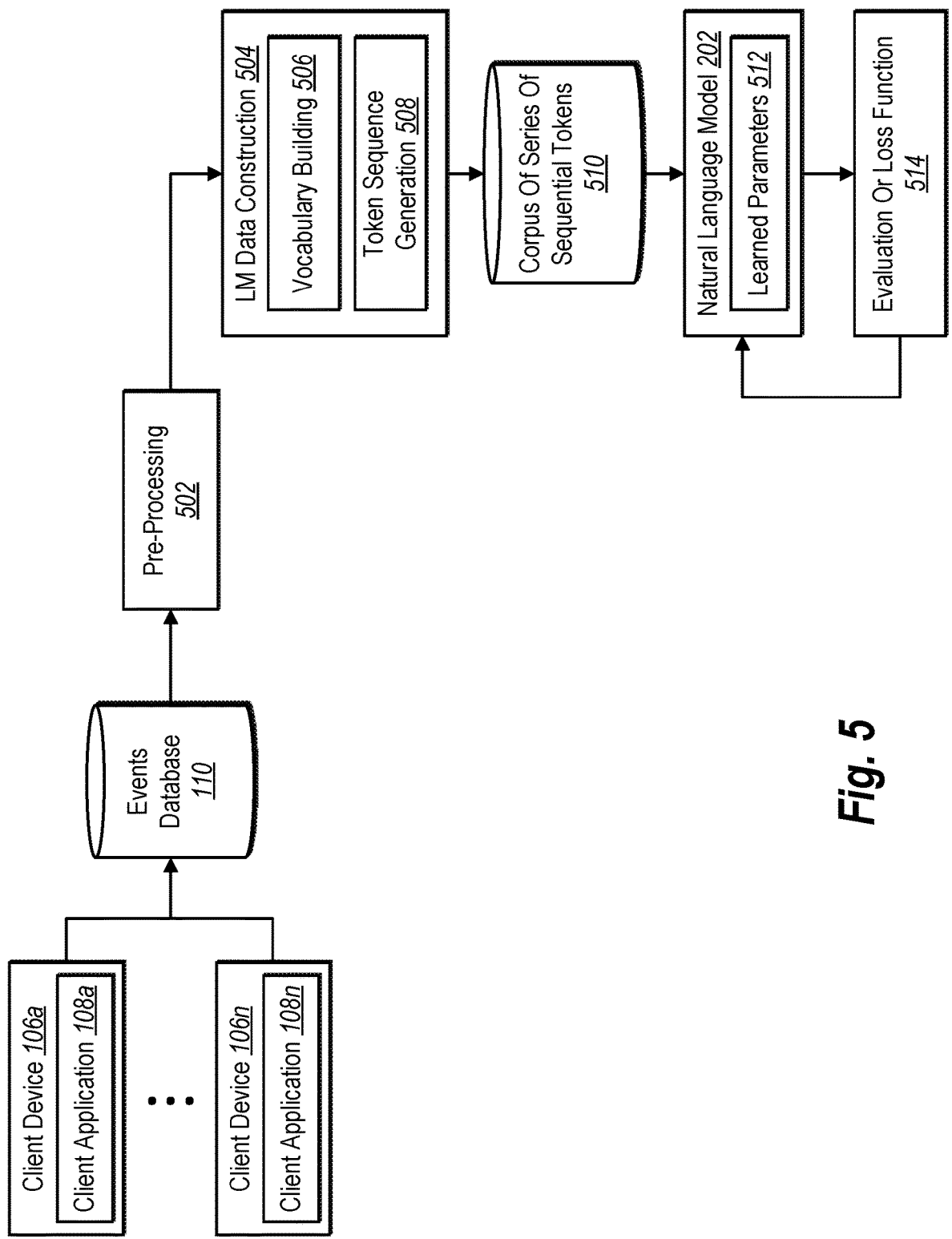
FIG. 5 illustrates an example process flow for training and tuning a natural language model in accordance with one or more embodiments.

As mentioned above, the user activity sequence system 104 can train the natural language model 202 on a corpus of series of sequential tokens. FIG. 5 illustrates an example process flow for training and tuning the natural language model 202 in accordance with one or more embodiments. As shown in FIG. 5 (and described above), the events database 110 comprises raw event data generated in response to activity events detected at the client devices 106.

From the raw event data, the user activity sequence system 104 can generate and/or modify the raw event data at act 502 by pre-processing raw event data. For example, the user activity sequence system 104 may sample raw event data for a percentage (e.g., a top n %) of user accounts of the content management system 103. In addition, the user activity sequence system 104 may sample raw event data for a predetermined time period (e.g., to obtain a sufficient amount of training data).

As another example of pre-processing at act 502, the user activity sequence system 104 may filter raw event data. In filtering raw event data, the user activity sequence system 104 can remove unreliable information included in the raw event data. In addition, the user activity sequence system 104 can filter out duplicative data. For example, the user activity sequence system 104 may filter out duplicative instances of a same type of activity event that occurs multiple times. Similarly, the user activity sequence system 104 may filter (e.g., select one of) multiple types of activity events identified for a single activity event. In these or other embodiments, the user activity sequence system 104 may group duplicates by a user account id, a timestamp, and a digital content item id. Additionally or alternatively, the user activity sequence system 104 may determine a group of duplicate types of activity events. In turn, the user activity sequence system 104 may ignore and/or remove such raw event data when pre-processing the raw event data at act 502.

At act 504, the user activity sequence system 104 constructs language model data for generating a corpus of series of sequential tokens 510. To do so, the user activity sequence system 104 builds a lexicon or vocabulary at act 506. In these or other embodiments, the lexicon can vary depending on the natural language model 202 and/or a use case. For example, the user activity sequence system 104 may generate a first lexicon for a first user segment of user accounts and a second lexicon for a second user segment of user accounts. To illustrate an example of building vocabulary at act 506, the user activity sequence system 104 can utilize the SHA-256 hashing function to generate tokens with 16 bit hex digest. In some embodiments, the user activity sequence system 104 utilizes one or more token dictionaries. For instance, the user activity sequence system 104 may utilize an event token diction for applying an activity index as a token prefix. As another example, the user activity sequence system 104 may utilize a time inevent token dictionary for applying a time inactivity index as a token prefix (e.g., for the time_diff feature mentioned above).

With the generated tokens, the user activity sequence system 104 can perform an act 508 to generate a series of sequential tokens (e.g., as described above in relation to FIG. 3). Additionally, in some embodiments, the user activity sequence system 104 may arrange the series of sequential tokens according to predetermined time thresholds (e.g., for construction of sentences, documents, etc.). Additionally or alternatively, the user activity sequence system 104 may arrange the series of sequential tokens according to n-grams (e.g., trigrams). Further, in some embodiments, the user activity sequence system 104 may add formatting elements to aid the natural language model 202 (e.g., "<s>" and "</s>" to mark the respective beginning and end of each sentence). In some embodiments, the user activity sequence system 104 arranges the series of sequential tokens based on tags or labels representing actual actions (or workflows) performed by user accounts of the content management system 103.

Based on the generated series of sequential tokens (i.e., a plurality of series of sequential tokens), the user activity sequence system 104 can generate or populate the corpus of series of sequential tokens 510 for applying to the natural language model 202. In these or other embodiments, the corpus of series of sequential tokens 510 comprises many series of sequential tokens that correspond to many different users (e.g., user accounts) of the content management system 103. By using the series of sequential tokens associated with many different user accounts of the content management system 103, the user activity sequence system 104 can accurately train the natural language model 202 despite some user accounts individually providing insufficient training data. In turn, the user activity sequence system 104 can cause the natural language model 202 to execute a training iteration on training data for generating a predicted activity event. Then, at act 514, utilizing one or more evaluations or loss functions, the user activity sequence system 104 can analyze the predicted activity event.

In some embodiments, (e.g., where the natural language model 202 is a statistical model, such as an n-grams model), analyzing the predicted activity event at act 514 comprises determining one or more evaluation metrics based on the predicted activity event. Example evaluation metrics include perplexity, bits-per-character, cross entropy, click-throughrate, receiver operating characteristic (ROC score), an area under curve (AUC) score for the ROC curve or (AUC-ROC score), or precision-recall AUC. In these or other embodiments, the user activity sequence system 104 may implement different evaluation metrics and/or threshold standards for evaluation metrics depending on a use case (e.g., for ranking a next activity, suggesting content, or surfacing activity highlights).

Based on the evaluation metric, the user activity sequence system 104 can update one or more learned parameters 512 and iterate further training cycles at act 514. In at least one embodiment, the user activity sequence system 104 may update a particular parameter, such as size of the lexicon generated at act 506. Additionally or alternatively, the user activity sequence system 104 may perform one or more acts or algorithms for training the natural language model 202 as outlined in Jurafsky, including updating the learned parameters 512 to reflect one or more smoothing parameters, an unknown word (UNK) parameter, etc.

In some embodiments (e.g., where the natural language model 202 is an artificial neural network), the user activity sequence system 104 can compare the predicted activity to a ground truth (i.e., an actual next event as included in the corpus of series of sequential tokens 510) at act 514. In these or other embodiments, the loss function can include a regression loss function (e.g., a mean square error function, a quadratic loss function, an L2 loss function, a mean absolute error/L1 loss function, mean bias error, etc. Additionally or alternatively, the loss function can include a classification loss function (e.g., a hinge loss/multi-class SVM loss function, cross entropy loss/negative log likelihood function, etc.). Further, the loss function can return quantifiable data regarding the difference between the predicted activity event and the ground truth. In particular, the loss function (e.g., as part of a back-propagation process for a neural network) can return such loss data to the natural language model 202 where the user activity sequence system 104 can adjust the learned parameters 512 to improve the quality of predictions (by narrowing the difference between predicted activity events and the ground truth). Moreover, the training/learning iteration just described can be an iterative process, as shown by the return arrow between act 514 and the natural language model 202 such that the user activity sequence system 104 can continually adjust the learned parameters 512 over learning cycles.

In these or other embodiments (e.g., where the natural language model 202 comprises an artificial neural network), the user activity sequence system 104 can also employ other training acts or algorithms than described above. For example, instead of generating a vocabulary and token sequences at act 504, the user activity sequence system 104 can generate a 17-dimensional one-hot vector (sixteen dimensions for the most frequent actions and one dimension for all others). As a first example embedding approach for training this example of the natural language model 202, the user activity sequence system 104 utilizes an approach similar to word2vec where the user activity sequence system 104 adds an embedding layer to convert the one-hot encoded activity event vector into a dense layer. To analyze the sequence of activity event vectors, the user activity sequence system 104 determines the average of all embedding layers as the final embedded input layer for the artificial neural network model. For example, the user activity sequence system 104 may, for each activity event in a sequence of activity events, determine an activity event vector of length 16. In turn, the user activity sequence system 104 may determine the average of all the activity event vectors.

As a second example embedding approach for training the artificial neural network model, the user activity sequence system 104 utilizes a sequence modeling approach. For example, the user activity sequence system 104 takes the order of the activity events into account and applies one or more RNN and/or LSTM layers to the sequence of activity event vectors. For example, the user activity sequence system 104 may, at a final layer of the RNN and/or LSTM network, generate the embedded input for the artificial neural network.

As a third example embedding approach for training the artificial neural network model, the user activity sequence system 104 embeds each activity event and accounts for the order of the activity events. In this approach, the user activity sequence system 104 can express the order in a weighted sum of the average final embedding layer described in the first approach. For example, the user activity sequence system 104 may, for each activity event in a sequence of activity events, determine an activity event vector of length 16. In turn, the user activity sequence system 104 may determine the weighted average of all the activity event vectors (wherein the weight can be inverse of recency or the timestamp differential).

In these or other embodiments, the user activity sequence system 104 can compare results (e.g., AUC-ROC scores, PR-AUC scores, etc.) among the foregoing and other embedding approaches for training the natural language model 202. In addition, the user activity sequence system 104 can compare results under the foregoing training approaches with results of the natural language model 202 trained as a statistical model. In this manner, the user activity sequence system 104 may select a training approach that provides more accurate predicted activity events.

Figure 6:
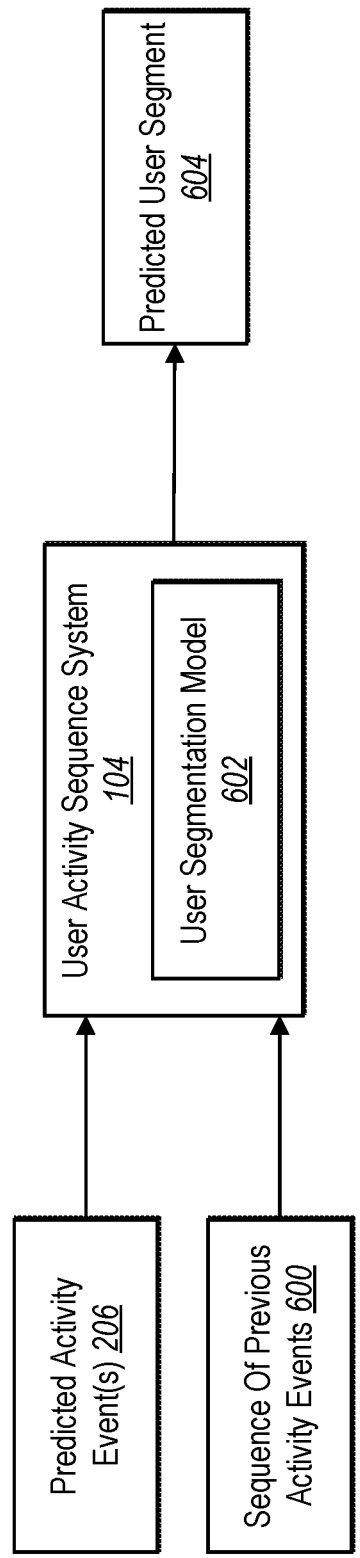
FIG. 6 illustrates an example process flow for generating a predicted user segment in accordance with one or more embodiments.

As mentioned above, the user activity sequence system 104 can generate a user segment classification by applying a predicted activity event as part of a sequence of activity events to a trained user segmentation model. In accordance with one or more embodiments, FIG. 6 illustrates the user activity sequence system 104 utilizing a user segmentation model 602 to generate a predicted user segment 604. In particular, FIG. 6 shows the user activity sequence system 104 applying both the predicted activity event 206 (as described above in relation to FIG. 2) and a sequence of previous activity events 600 (e.g., corresponding to the raw event data 210a-210n for activity events leading up to the predicted activity event 206) as inputs to the user segmentation model 602. Based on the inputs of the predicted activity event 206 and the sequence of previous activity event 600, the user segmentation model 602 can output the predicted user segment 604.

As described above in relation to FIG. 2, the predicted activity event 206 and the sequence of previous activity events 600 together form a sequential workflow pattern that the user activity sequence system 104 can compare with workflow patterns corresponding to predetermined user segments. Utilizing the user segmentation model 602, in particular, the user activity sequence system 104 can leverage a trained computational model to generate the predicted user segment 604. For example, the user segmentation model 602 may include a computational model that generates the predicted user segment based on activity sequence similarities. To illustrate, the user segmentation model 602 can include a trained classifier, artificial neural network, etc. In some embodiments, the user segmentation model 602 is a single user segmentation model. Alternatively, the user segmentation model 602 comprises multiple, discrete user segmentation models (e.g., that correspond to different user segments, such as a content creator segmentation model, a member upsell user segment, etc.).

In these or other embodiments, the user segmentation model 602 may generate the predicted user segment 604 by generating similarity scores for activity event sequences. Specifically, in one or more embodiments, the user activity sequence system 104 determines a respective similarity score for each workflow pattern in a plurality of workflow patterns corresponding to predetermined user segments. The similarity scores represent a respective relationship (e.g., a degree of similarity) to a generated sequential workflow pattern comprised of the predicted activity event 206 and the sequence of previous activity events 600.

To determine the similarity scores of activity sequences between the plurality of workflow patterns and the generated sequential workflow pattern, the user segmentation model 602 can apply learned parameters to specific activity events and/or corresponding orders of activity events. In these or other embodiments, the learned parameters correspond to one or more training iterations in generating predicted user segments based on training data and comparing the predicted user segments with ground truth data. Accordingly, the user activity sequence system 104 may generate a first similarity score for a first user segment, a second similarity score for a second user segment, and so forth.

Based on the respective similarity scores for the plurality of workflow patterns, the user activity sequence system 104 can generated the predicted user segment 604. In particular, the user activity sequence system 104 can identify a given user segment corresponding to a highest similarity score (or multiple user segments corresponding to a set of highest similarity scores if generating multiple predicted user segments). Based on the given user segment corresponding to the highest similarity score, the user activity sequence system 104 may generate the predicted user segment 604 as the given user segment.

Of course, in additional or alternative embodiments, the user segmentation model 602 utilizes one or more other approaches. For example, in some embodiments, the user segmentation model 602 generates probability scores, sequence mappings, etc. Additionally or alternatively, the user segmentation model 602 utilizes metrics or indicators particular to a user segment (e.g., a number of followers for an influencer user segment).

Figure 7:
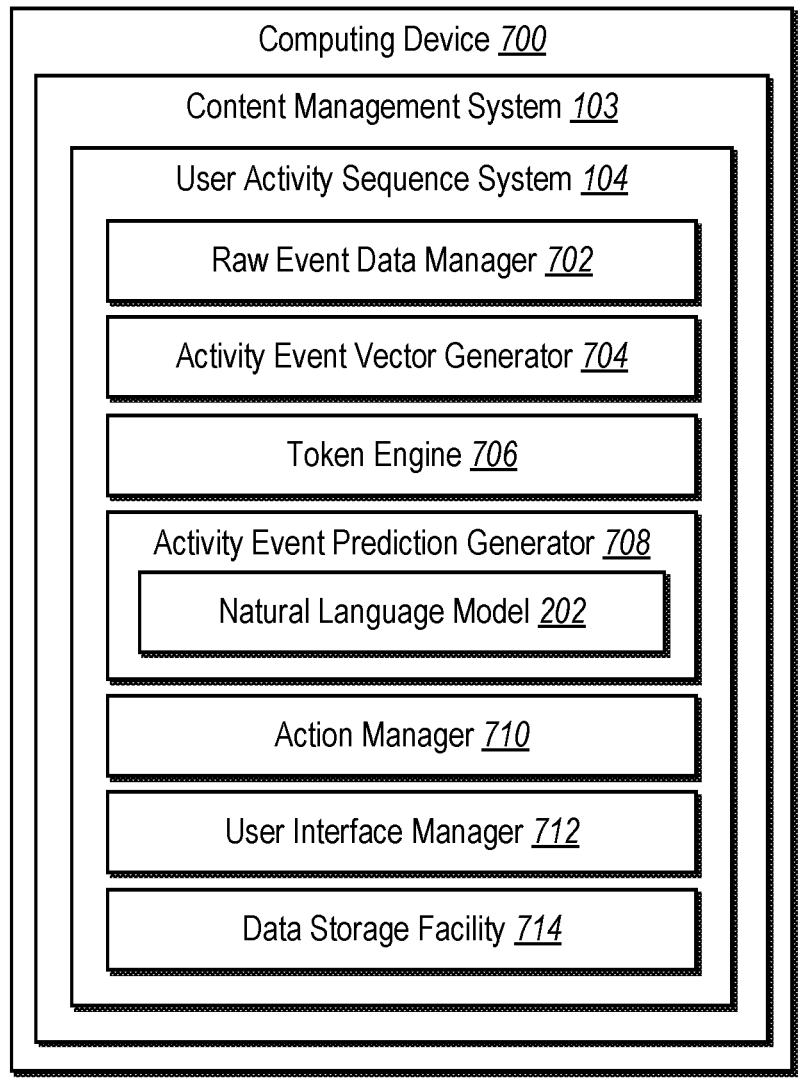
FIG. 7 illustrates an example schematic diagram of a user activity sequence system in accordance with one or more embodiments.

Turning to FIG. 7, additional detail will now be provided regarding various components and capabilities of the user activity sequence system 104. In particular, FIG. 7 illustrates an example schematic diagram of a computing device 900 (e.g., the server(s) 102, the client devices 106) implementing the user activity sequence system 104 in accordance with one or more embodiments of the present disclosure. As shown, the user activity sequence system 104 is further implemented by the server(s) 102 and the content management system 103. Also illustrated, the user activity sequence system 104 can include a raw event data manager 702, an activity event vector generator 704, a token engine 706, an activity event prediction generator 708, an action manager 710, a user interface manager 712, and a data storage facility 714.

The raw event data manager 702 can obtain, send, receive, process, store, and/or analyze raw event data generated in response to performance of activity events (as described in relation to the foregoing figures). In particular, the raw event data manager 702 can identify activity events by extracting, sampling, and filtering raw event data to determine relevant features for subsequent analyses. In addition, the raw event data manager 702 can identify sequences of activity events (e.g., by analyzing timestamp data in the raw event data).

The activity event vector generator 704 can construct feature vector embeddings for features identified by the raw event data manager 702 (as described in relation to the foregoing figures). In particular, the activity event vector generator 704 can concatenate feature vector embeddings to generate an activity event vector. Further, in some embodiments, the activity event vector generator 704 combines consecutive activity event vectors to generate a sequence of activity event vectors.

The token engine 706 can generate a token for an activity event vector (as described in relation to the foregoing figures). In particular, the token engine 706 can utilize a hashing function to hash an activity event vector (or a portion of the activity event vector as described above) for generating a token. Accordingly, in some embodiments, the token engine 706 combines consecutive tokens to generate a series of sequential tokens.

The activity event prediction generator 708 can utilize the natural language model 202 to generate predicted activity events (as described in relation to the foregoing figures). In particular, the activity event prediction generator 708 employ the natural language model 202 to generate LM scores for candidate sequences that include the series of sequential tokens from the token engine 706. Based on the LM scores, the activity event prediction generator 708 can select, as the predicted activity event, a candidate activity event corresponding to a candidate sequence associated with a highest LM score. Alternatively, in some embodiments, the activity event prediction generator 708 selects multiple candidate activity events (which correspond to candidate sequences associated with several of the highest LM scores) as the predicted activity events.

The action manager 710 can perform one or more actions responsive to the predicted activity event (as described in relation to the foregoing figures). In particular, the action manager 710 can generate one or more suggestions, such as suggested content, an activity highlight to view, or a digital content item to share. In some embodiments, the action manager 710 can also update and/or modify digital content stored/arranged within the content management system 103.

The user interface manager 712 can provide, manage, and/or control a graphical user interface (or simply "user interface"). In particular, the user interface manager 712 may generate and display a user interface by way of a display screen composed of a plurality of graphical components, objects, and/or elements that allow a user to perform a function. For example, the user interface manager 712 can receive user inputs from a user, such as a click/tap to edit or share a digital content item. Additionally, the user interface manager 712 can present a variety of types of information, including text, digital media items, workspaces, search results, product recommendations, or other information.

The data storage facility 714 maintains data for the user activity sequence system 104. The data storage facility 714 (e.g., via one or more memory devices) can maintain data of any type, size, or kind, as necessary to perform the functions of the user activity sequence system 104. For example, the data storage facility 714 can include a hashing library, learned parameters, etc.

Each of the components of the computing device 700 can include software, hardware, or both. For example, the components of the computing device 700 can include one or more instructions stored on a computer-readable storage medium and executable by processors of one or more computing devices, such as a client device or server device.

When executed by the one or more processors, the computer-executable instructions of the user activity sequence system 104 can cause the computing device(s) (e.g., the computing device 700) to perform the methods described herein. Alternatively, the components of the computing device 700 can include hardware, such as a special-purpose processing device to perform a certain function or group of functions. Alternatively, the components of the computing device 700 can include a combination of computer-executable instructions and hardware.

Furthermore, the components of the computing device 700 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 700 may be implemented as a stand-alone application, such as a desktop or mobile application. Furthermore, the components of the computing device 700 may be implemented as one or more web-based applications hosted on a remote server. Additionally or alternatively, the components of the computing device 700 may also be implemented in a suite of mobile device applications or "apps."

Figure 8:
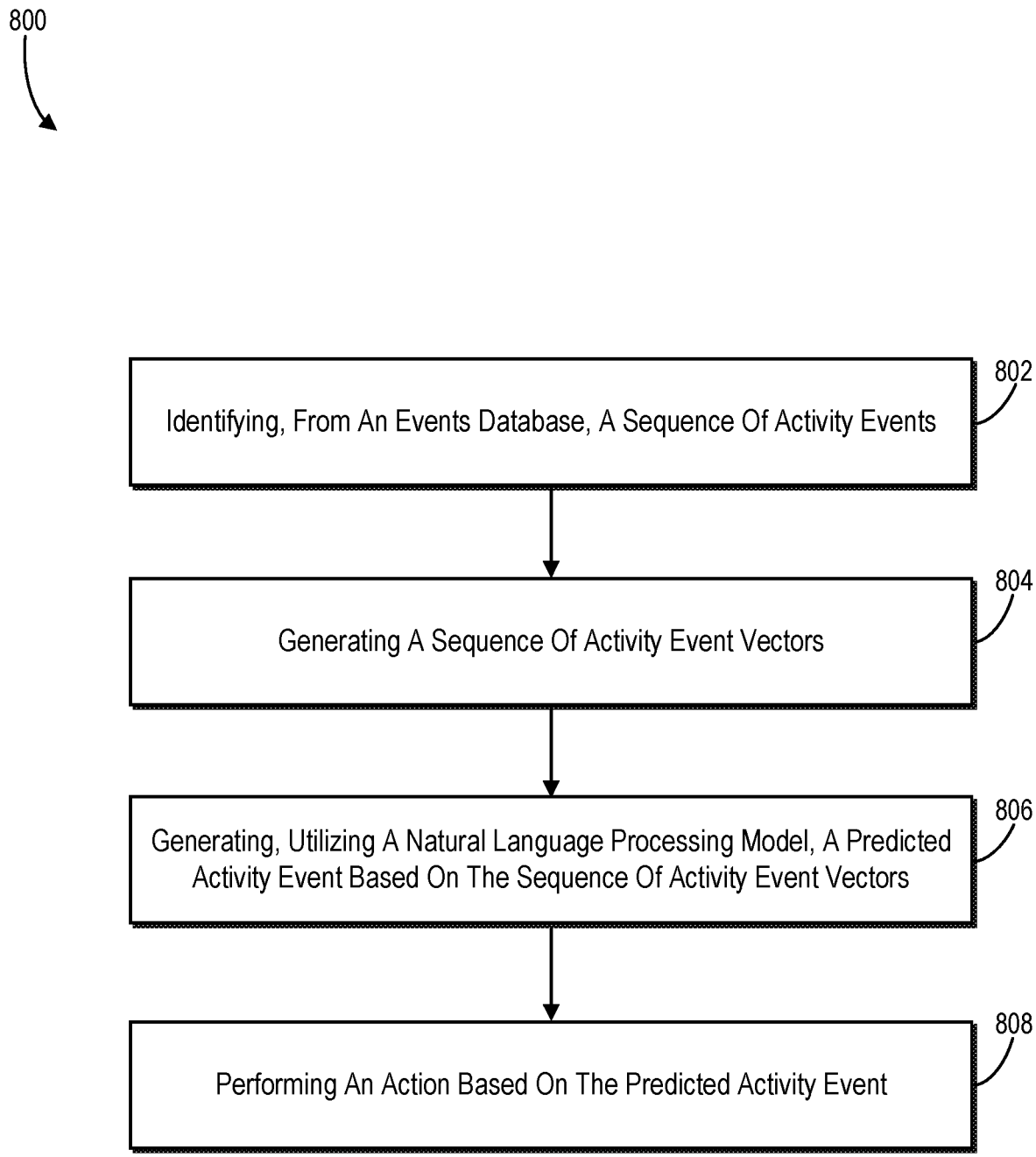
FIG. 8 illustrates a flowchart of a series of acts for performing an action based on a predicted activity event in accordance with one or more embodiments.

FIGS. 1-6, the corresponding text, and the examples provide several different systems, methods, techniques, components, and/or devices of the user activity sequence system 104 in accordance with one or more embodiments. In addition to the above description, one or more embodiments can also be described in terms of flowcharts including acts for accomplishing a particular result. For example, FIG. 8 illustrates a flowchart of a series of acts 800 for performing an action based on a predicted activity event in accordance with one or more embodiments. The user activity sequence system 104 may perform one or more acts of the series of acts 800 in addition to or alternatively to one or more acts described in conjunction with other figures. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown, the series of acts 800 includes an act 802 of identifying, from an events database, a sequence of activity events. In these or other embodiments, each activity event within the sequence of activity events comprises raw event data associated with a user account (or a group of user accounts) of a content management system. In some embodiments, identifying the sequence of activity events comprises analyzing, from the events database, raw event data to identify timestamps for activity events for a threshold time period; and determining, based on the identified timestamps, that a subset of the activity events occurring during the threshold time period corresponds to the sequence of activity events.

The series of acts 800 further includes an act 804 of generating a sequence of activity event vectors. For example, act 804 may include generating the sequence of activity event vectors by generating an activity event vector for each activity event based on the raw event data for each respective activity event. In some embodiments, generating the sequence of activity event vectors comprises: generating feature embeddings for features from the raw event data of each activity event within the sequence of activity events; concatenating a first set of feature embeddings corresponding to a first activity event to generate a first activity event vector; and concatenating a second set of feature embeddings corresponding to a second activity event subsequent to the first activity event to generate a second activity event vector.

The series of acts 800 further includes an act 806 of determining, utilizing a natural language processing (NLP) model, a predicted activity event based on the sequence of activity event vectors. In some embodiments, generating the predicted activity event comprises: determining, for a set of candidate sequences combining the series of sequential tokens with respective tokens of candidate activity events, a set of probability scores indicating a likelihood that a candidate sequence is a correct sequence; and selecting, as the predicted activity event, a candidate activity event corresponding to a candidate sequence associated with a highest probability score. In some embodiments, the NLP model comprises a long short-term memory neural network.

In some embodiments, generating the predicted activity event at act 806 comprises: generating a first predicted activity event for a first user account of the group of user accounts; and generating a second predicted activity event for a second user account of the group of user accounts, wherein the second predicted activity event differs from the first predicted activity event.

In addition, the series of acts 800 includes an act 808 of performing an action based on the predicted activity event. In some embodiments, performing the action comprises providing, for display on a client device associated with the user account, one or more suggestions based on the predicted activity event. In additional or alternative embodiments, performing the action comprises: providing, for display on a first client device associated with the first user account, a first action suggestion related to a digital content item accessible by the group of user accounts, wherein the first action suggestion is based on the first predicted activity event; and providing, for display on a second client device associated with the second user account, a second action suggestion related to the digital content item accessible by the group of user accounts, wherein: the second action suggestion differs from the first action suggestion; and the second action suggestion is based on the second predicted activity event. In at least one embodiment, performing the action based on the predicted activity event comprises predicting a user segment for the user account.

It is understood that the outlined acts in the series of acts 800 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 8, act(s) in the series of acts 800 may include an act to generate, utilizing a hashing function, respective tokens for each activity event vector in the sequence of activity event vectors; and generate, based on the respective tokens, a series of sequential tokens for the sequence of activity event vectors.

As another example of an additional act not shown in FIG. 8, act(s) in the series of acts 800 may include an act to group the sequence of activity event vectors for generating a series of sequential tokens by grouping, into the sequence of activity event vectors, activity event vectors based on timestamps of corresponding feature embeddings.

As an additional example of an act not shown in FIG. 8, act(s) in the series of acts 800 may include an act to generate, from the events database, a corpus of series of sequential tokens associated with multiple user accounts of a content management system; and apply the corpus of series of sequential tokens to the NLP model to identify one or more learned parameters.

Additionally, example act(s) not shown in FIG. 8 may include: determining a set of predicted activity events based on the sequence of activity event vectors; and perform multiple actions based on the set of predicted activity events, each action corresponding to a respective predicted activity event of the set of predicted activity events.

In yet another example an additional act not shown in FIG. 8, act(s) in the series of acts 800 may include an act to: identify, from an events database, a sequence of activity events, each activity event within the sequence of activity events comprising raw event data associated with a user account of a content management system; generate a sequence of activity event vectors by generating an activity event vector for each activity event based on the raw event data for each respective activity event; provide the sequence of activity event vectors to a natural language processing (NLP) model; receive, from the NLP model, one or more predicted activity events; and provide, for display on a client device associated with the user, one or more suggestions based on the one or more predicted activity events.

In an additional example of an act not shown in FIG. 8, act(s) in the series of acts 800 may include an act to provide, for display on the client device associated with the user account, the one or more suggestions comprising: a suggested team workspace that includes a portion of a memory device accessible by the user account and one or more other user accounts of the content management system; or a suggested digital file to digitally share with the one or more other user accounts.

As another example of an act not shown in FIG. 8, act(s) in the series of acts 800 may include an act to provide, for display on the client device associated with the user account, the one or more suggestions comprising a suggested access privilege or a suggested software tool based on a user-account classification for the user account.

As still another example of an act not shown in FIG. 8, act(s) in the series of acts 800 may include an act to provide, for display on the client device associated with the user account, the one or more suggestions comprising an action suggestion that includes one or more of: downloading, accessing, or editing a digital content item; creating a calendar invite; or generating a digital reminder or a task list.

As a further example of an act not shown in FIG. 8, act(s) in the series of acts 800 may include an act to provide the sequence of activity event vectors to the NLP model by generating a token for each activity event vector in the sequence of activity event vectors. In yet another example of an act not shown in FIG. 8, act(s) in the series of acts 800 may include an act of generating one or more activity highlights pertaining to digital activity in a team workspace accessible by the group of user accounts.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
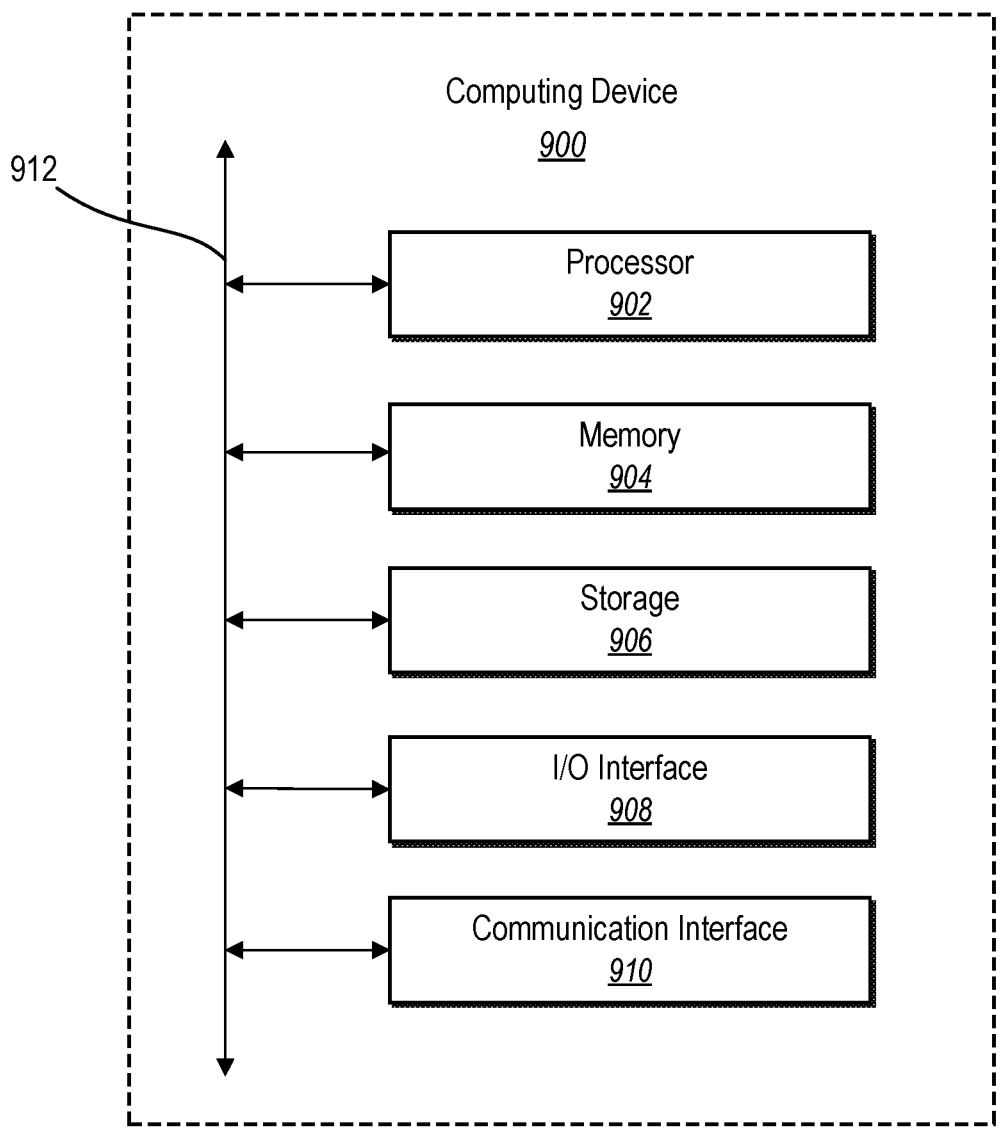
FIG. 9 illustrates a block diagram of an example computing device for implementing one or more embodiments of the present disclosure.

FIG. 9 illustrates a block diagram of exemplary computing device 900 that may be configured to perform one or more of the processes described above. One will appreciate that client devices described herein and/or the content management system 103 may comprise one or more computing devices such as computing device 900. As shown by FIG. 9, computing device 900 can comprise processor 902, memory 904, storage device 906, I/O interface 908, and communication interface 910, which may be communicatively coupled by way of communication infrastructure 912. While an exemplary computing device 900 is shown in FIG. 9, the components illustrated in FIG. 9 are not intended to be limiting. Additional or alternative components may be used in other embodiments. Furthermore, in certain embodiments, computing device 900 can include fewer components than those shown in FIG. 9. Components of computing device 900 shown in FIG. 9 will now be described in additional detail.

In particular embodiments, processor 902 includes hardware for executing instructions, such as those making up a computer program. As an example, and not by way of limitation, to execute instructions, processor 902 may retrieve (or fetch) the instructions from an internal register, an internal cache, memory 904, or storage device 906 and decode and execute them. In particular embodiments, processor 902 may include one or more internal caches for data, instructions, or addresses. As an example and not by way of limitation, processor 902 may include one or more instruction caches, one or more data caches, and one or more translation lookaside buffers (TLBs). Instructions in the instruction caches may be copies of instructions in memory 904 or the storage device 906. Additionally, processor 902 can include or represent one or more processors or processor cores.

Memory 904 may be used for storing data, metadata, and programs for execution by the processor(s). Memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 904 may be internal or distributed memory.

Storage device 906 includes storage for storing data or instructions. As an example and not by way of limitation, storage device 906 can comprise a non-transitory storage medium described above. Storage device 906 may include a hard disk drive (HDD), a floppy disk drive, flash memory, an optical disc, a magneto-optical disc, magnetic tape, or a Universal Serial Bus (USB) drive or a combination of two or more of these. Storage device 906 may include removable or non-removable (or fixed) media, where appropriate. Storage device 906 may be internal or external to computing device 900. In particular embodiments, storage device 906 is non-volatile, solid-state memory. In other embodiments, Storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 908 allows a user to provide input to, receive output from, and otherwise transfer data to and receive data from computing device 900. I/O interface 908 may include a mouse, a keypad or a keyboard, a touch screen, a camera, an optical scanner, network interface, modem, other known I/O devices or a combination of such I/O interfaces. I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 908 is configured to provide graphical data to a display for presentation to a user. The graphical data may be representative of one or more graphical user interfaces and/or any other graphical content as may serve a particular implementation.

Communication interface 910 can include hardware, software, or both. In any event, communication interface 910 can provide one or more interfaces for communication (such as, for example, packet-based communication) between computing device 900 and one or more other computing devices or networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 912 may include hardware, software, or both that couples components of computing device 900 to each other. As an example and not by way of limitation, communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 10:
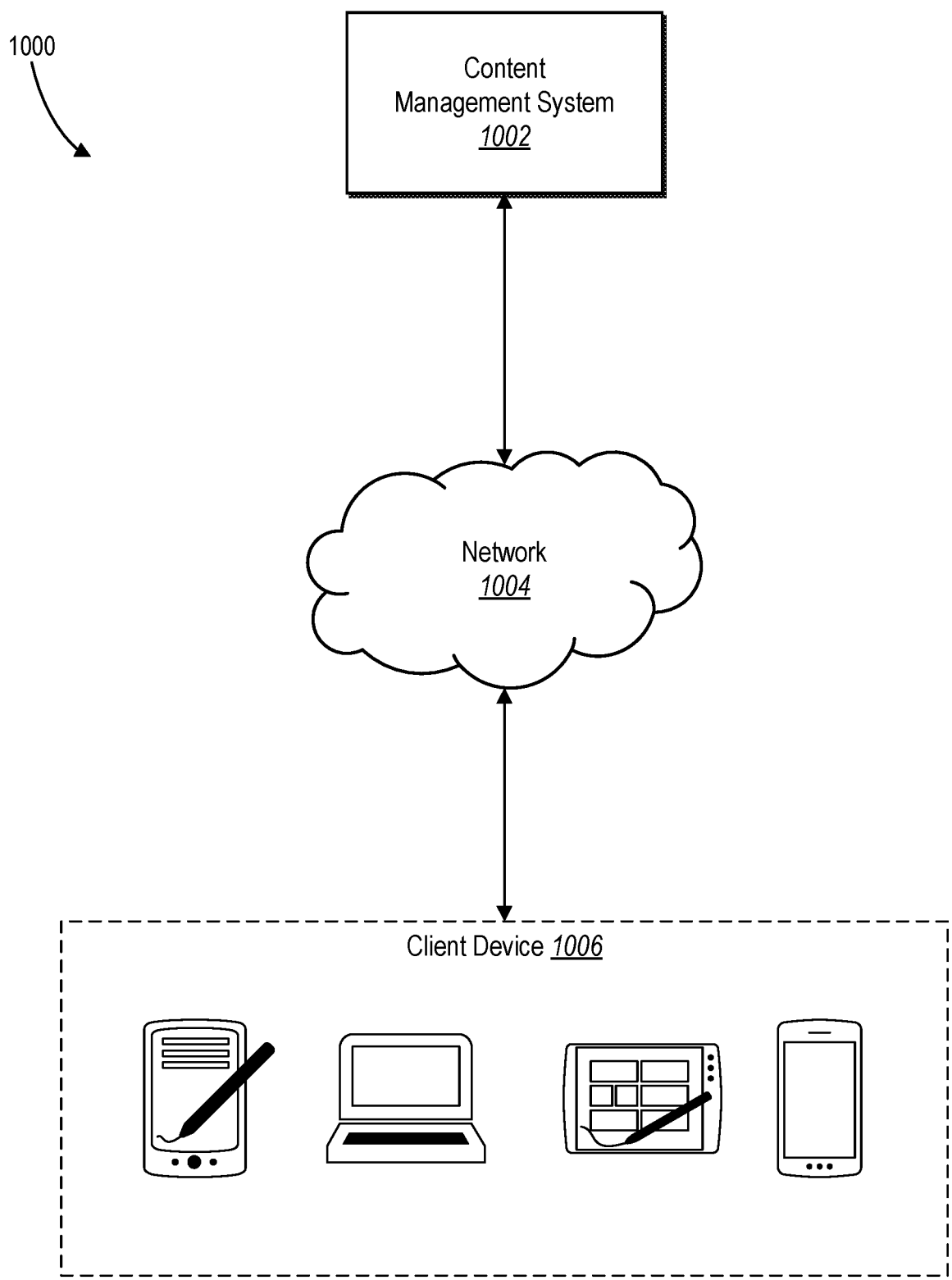
FIG. 10 is an example network environment of a content management system in accordance with one or more embodiments described herein.

FIG. 10 is a schematic diagram illustrating an environment 1000 within which one or more embodiments of content management system 103 can be implemented. For example, as shown in FIG. 10, content management system 1002 (e.g., content management system 103) may generate, store, manage, receive, and send digital content (such as digital videos). For example, content management system 1002 may send and receive digital content to and from client devices 1006 by way of network 1004. In particular, content management system 1002 can store and manage a collection of digital content. Content management system 1002 can manage the sharing of digital content between computing devices associated with a plurality of users. For instance, content management system 1002 can facilitate a user sharing a digital content with another user of content management system 1002.

In particular, content management system 1002 can manage synchronizing digital content across multiple client devices 1006 associated with one or more users. For example, a user may edit digital content using client device 1006. The content management system 1002 can cause the client device 1006 to send the edited digital content to content management system 1002. Content management system 1002 then synchronizes the edited digital content on one or more additional computing devices.

In addition to synchronizing digital content across multiple devices, one or more embodiments of content management system 1002 can provide an efficient storage option for users that have large collections of digital content. For example, content management system 1002 can store a collection of digital content on content management system 1002, while the client device 1006 only stores reduced-sized versions of the digital content. A user can navigate and browse the reduced-sized versions (e.g., a thumbnail of a digital image) of the digital content on client device 1006. In particular, one way in which a user can experience digital content is to browse the reduced-sized versions of the digital content on client device 1006.

Another way in which a user can experience digital content is to select a reduced-size version of digital content to request the full- or high-resolution version of digital content from content management system 1002. In particular, upon a user selecting a reduced-sized version of digital content, client device 1006 sends a request to content management system 1002 requesting the digital content associated with the reduced-sized version of the digital content. Content management system 1002 can respond to the request by sending the digital content to client device 1006. Client device 1006, upon receiving the digital content, can then present the digital content to the user. In this way, a user can have access to large collections of digital content while minimizing the amount of resources used on client device 1006.

Client device 1006 may be a desktop computer, a laptop computer, a tablet computer, a personal digital assistant (PDA), an in- or out-of-car navigation system, a smart TV, a virtual reality (VR) or augmented reality (AR) device, a handheld device, a wearable device, a smartphone or other cellular or mobile phone, or a mobile gaming device, other mobile device, or other suitable computing devices. Client device 1006 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 1004.

Network 1004 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1006 may access the content management system 1002.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
    at least one processor; and
    at least one non-transitory computer-readable storage medium storing instructions that, when executed by the at least one processor, cause the system to:
        identify, from an events database, a sequence of activity events, each activity event within the sequence of activity events comprising raw event data associated with a user account of a content management system;
        generate a sequence of activity event vectors by generating an activity event vector for each activity event based on the raw event data for each respective activity event;
        determine, utilizing a natural language processing (NLP) model, a predicted activity event based on the sequence of activity event vectors; and
        perform an action based on the predicted activity event.

2. The system of claim 1, further comprising instructions that, when executed by the at least one processor, cause the system to perform the action by providing, for display on a client device associated with the user account, one or more suggestions based on the predicted activity event.

3. The system of claim 1, further comprising instructions that, when executed by the at least one processor, cause the system to generate the sequence of activity event vectors by:
    generating feature embeddings for features from the raw event data of each activity event within the sequence of activity events;
    concatenating a first set of feature embeddings corresponding to a first activity event to generate a first activity event vector; and
    concatenating a second set of feature embeddings corresponding to a second activity event subsequent to the first activity event to generate a second activity event vector.

4. The system of claim 1, further comprising instructions that, when executed by the at least one processor, cause the system to:
    generate, utilizing a hashing function, respective tokens for each activity event vector in the sequence of activity event vectors; and
    generate, based on the respective tokens, a series of sequential tokens for the sequence of activity event vectors.

5. The system of claim 4, further comprising instructions that, when executed by the at least one processor, cause the system to generate, utilizing the NLP model, the predicted activity event by:
    determining, for a set of candidate sequences combining the series of sequential tokens with respective tokens of candidate activity events, a set of probability scores; and
    selecting, as the predicted activity event, a candidate activity event corresponding to a candidate sequence associated with a highest probability score.

6. The system of claim 1, further comprising instructions that, when executed by the at least one processor, cause the system to group the sequence of activity event vectors for generating a series of sequential tokens by grouping, into the sequence of activity event vectors, activity event vectors based on timestamps of corresponding feature embeddings.

7. The system of claim 1, further comprising instructions that, when executed by the at least one processor, cause the system to:
    generate, from the events database, a corpus of series of sequential tokens associated with multiple user accounts of a content management system; and
    apply the corpus of series of sequential tokens to the NLP model to identify one or more learned parameters.

8. The system of claim 1, further comprising instructions that, when executed by the at least one processor, cause the system to:
    determine a set of predicted activity events based on the sequence of activity event vectors; and
    perform multiple actions based on the set of predicted activity events, each action corresponding to a respective predicted activity event of the set of predicted activity events.

9. The system of claim 1, further comprising instructions that, when executed by the at least one processor, cause the system to perform the action based on the predicted activity event by predicting a user segment for the user account.

10. The system of claim 1, further comprising instructions that, when executed by the at least one processor, cause the system to identify, from the events database, the sequence of activity events by:
    analyzing, from the events database, raw event data to identify timestamps for activity events for a threshold time period; and
    determining, based on the identified timestamps, that a subset of the activity events occurring during the threshold time period corresponds to the sequence of activity events.

11. A non-transitory computer-readable medium storing instructions that, when executed by at least one processor, cause a computing device to:
    identify, from an events database, a sequence of activity events, each activity event within the sequence of activity events comprising raw event data associated with a user account of a content management system;
    generate a sequence of activity event vectors by generating an activity event vector for each activity event based on the raw event data for each respective activity event;
    provide the sequence of activity event vectors to a natural language processing (NLP) model;
    receive, from the NLP model, one or more predicted activity events; and
    provide, to a client device associated with the user account, one or more suggestions based on the one or more predicted activity events.

12. The non-transitory computer-readable medium of claim 11, further comprising instructions that, when executed by the at least one processor, cause the computing device to provide, for display on the client device associated with the user account, the one or more suggestions comprising:
- a suggested team workspace accessible by the user account and one or more other user accounts of the content management system;
- a suggested digital file to digitally share with the one or more other user accounts; or
- a suggested access privilege or a suggested software tool based on a user-account classification for the user account.

13. The non-transitory computer-readable medium of claim 11, further comprising instructions that, when executed by the at least one processor, cause the computing device to generate a sequence of activity event vectors by generating feature embeddings based on features from the raw event data of each activity event within the sequence of activity events.

14. The non-transitory computer-readable medium of claim 11, further comprising instructions that, when executed by the at least one processor, cause the computing device to provide, for display on the client device associated with the user account, the one or more suggestions comprising an action suggestion that includes one or more of:
- downloading, accessing, or editing a digital content item;
- creating a calendar invite;
- generating a digital reminder; or
- generating a task list.

15. The non-transitory computer-readable medium of claim 11, further comprising instructions that, when executed by the at least one processor, cause the computing device to provide the sequence of activity event vectors to the NLP model by generating a token for each activity event vector in the sequence of activity event vectors.

16. A computer-implemented method comprising:
- identifying, from an events database, a sequence of activity events, each activity event within the sequence of activity events comprising raw event data associated with a group of user accounts of a content management system;
- generating a sequence of activity event vectors by generating an activity event vector for each activity event based on the raw event data for each respective activity event;
- generating, utilizing a natural language processing (NLP) model, a predicted activity event based on the sequence of activity event vectors; and
- performing an action based on the predicted activity event.

17. The computer-implemented method of claim 16, wherein the NLP model comprises a long short-term memory neural network.

18. The computer-implemented method of claim 16, further comprising generating one or more activity highlights pertaining to digital activity in a team workspace accessible by the group of user accounts.

19. The computer-implemented method of claim 16, wherein generating the predicted activity event comprises:
- generating a first predicted activity event for a first user account of the group of user accounts; and
- generating a second predicted activity event for a second user account of the group of user accounts, wherein the second predicted activity event differs from the first predicted activity event.

20. The computer-implemented method of claim 19, wherein performing the action based on the predicted activity event comprises:
- providing, for display on a first client device associated with the first user account, a first action suggestion related to a digital content item accessible by the group of user accounts, wherein the first action suggestion is based on the first predicted activity event; and
- providing, for display on a second client device associated with the second user account, a second action suggestion related to the digital content item accessible by the group of user accounts, wherein:
- the second action suggestion differs from the first action suggestion; and
- the second action suggestion is based on the second predicted activity event.

* * * * *